US010093368B2

(12) United States Patent
Black et al.

(10) Patent No.: US 10,093,368 B2
(45) Date of Patent: Oct. 9, 2018

(54) APPARATUS FOR MANEUVERING PARKED MOTORCYCLES AND MOTOR SCOOTERS

(71) Applicant: BLACK MC PTY LTD, Toowong (AU)

(72) Inventors: Stuart Ian Black, Toowong (AU); Stephen John McGuiness, Oxley (AU)

(73) Assignee: BLACK MC PTY LTD., Toowong (AU)

( * ) Notice: Subject to any disclaimer, the term of this patent is extended or adjusted under 35 U.S.C. 154(b) by 0 days.

(21) Appl. No.: 15/328,344

(22) PCT Filed: Jul. 23, 2015

(86) PCT No.: PCT/AU2015/000428
§ 371 (c)(1),
(2) Date: Jan. 23, 2017

(87) PCT Pub. No.: WO2016/011483
PCT Pub. Date: Jan. 28, 2016

(65) Prior Publication Data
US 2017/0210437 A1   Jul. 27, 2017

(30) Foreign Application Priority Data

Jul. 24, 2014  (AU) ................................ 2014902871
Dec. 23, 2014  (AU) ................................ 2014905259

(51) Int. Cl.
*B62H 3/04*   (2006.01)
*B60P 3/075*   (2006.01)
(Continued)

(52) U.S. Cl.
CPC ............. *B62H 3/04* (2013.01); *B25H 1/0014* (2013.01); *B60B 19/003* (2013.01); *B60B 29/00* (2013.01);
(Continued)

(58) Field of Classification Search
CPC ............ B62B 2202/90; B62B 2301/02; B62B 5/0086; B62B 5/0089; B66F 3/005; B62H 3/04; B62H 3/08
See application file for complete search history.

(56) References Cited

U.S. PATENT DOCUMENTS 4,465,421 A * 8/1984 Murillo .................. B66F 7/246
                                                                280/79.4
4,784,402 A   11/1988 Roman
(Continued)

FOREIGN PATENT DOCUMENTS

DE   19546373 A1   6/1996
FR   2965780 A1   4/2012

OTHER PUBLICATIONS

Biketek 360 Degree Rear Floating Motorcycle Paddock Stand Mover, https://web.archive.org/web/20121008012234/http://www.bikermart.co.uk:80/proddetail.asp?prod=PDSR024 (Year: 2012).*
(Continued)

*Primary Examiner* — Mark C Hageman
(74) *Attorney, Agent, or Firm* — Heslin Rothenberg Farley & Mesiti P.C.; Victor A. Cardona, Esq.

(57) ABSTRACT

A dolly for supporting a tire of a motorcycle or motor scooter off the ground is provided. The dolly comprises: axially aligned wheels supported by a frame which has a frame part forward of the wheels and a frame part behind the wheels, the forward frame part having an open end being such that the motorcycle or motor scooter tire can locate in the open end, at least one tire gripping member on the forward frame part and adapted to wedge the tire when the forward frame part is lifted and release the tire when the forward frame part is lowered, and a wheel on the frame part behind the wheels.

20 Claims, 28 Drawing Sheets

(51) Int. Cl.

| | | |
|---|---|---|
| *B60B 29/00* | (2006.01) | |
| *B60B 30/00* | (2006.01) | |
| *B62B 5/00* | (2006.01) | |
| *B60B 19/00* | (2006.01) | |
| *B62H 3/08* | (2006.01) | |
| *B66F 3/00* | (2006.01) | |
| *B25H 1/00* | (2006.01) | |
| *B60B 30/02* | (2006.01) | |
| *B60B 30/10* | (2006.01) | |

(52) U.S. Cl.
CPC .............. *B60B 30/00* (2013.01); *B60B 30/02* (2013.01); *B60B 30/10* (2013.01); *B60P 3/075* (2013.01); *B62B 5/0083* (2013.01); *B62B 5/0086* (2013.01); *B62B 5/0089* (2013.01); *B62H 3/08* (2013.01); *B66F 3/005* (2013.01); *B60Y 2200/12* (2013.01); *B62B 2202/031* (2013.01); *B62B 2202/90* (2013.01); *B62B 2301/02* (2013.01)

(56) References Cited

U.S. PATENT DOCUMENTS

| | | | | |
|---|---|---|---|---|
| 6,092,787 | A | 7/2000 | Nayman | |
| 6,802,493 | B2* | 10/2004 | Lance | ..................... B66F 3/005 254/120 |
| 7,325,816 | B2* | 2/2008 | Johnson | .................. B60S 13/00 211/20 |
| 8,517,401 | B1 | 8/2013 | Horn et al. | |
| 8,556,279 | B2* | 10/2013 | McKinnon | ................ B62B 1/10 280/47.27 |
| 2002/0117459 | A1 | 8/2002 | Chen | |
| 2003/0067209 | A1* | 4/2003 | Marrero | .................. F41H 7/005 301/5.23 |
| 2004/0164605 | A1 | 8/2004 | Perras | |
| 2006/0163543 | A1* | 7/2006 | Kobacker, II | ........ B25H 1/0014 254/131 |
| 2013/0200316 | A1 | 8/2013 | Vanvalkenburgh | |

OTHER PUBLICATIONS

Motorcycle rear paddock stand dolly mover II Constands video, https://www.youtube.com/watch?v=VZmYTWBmVcU (Year: 2014).*

International Search Report and Written Opinion of the International Searching Authority dated Sep. 10, 2015 of International Application No. PCT/AU2015/000428 filed Jul. 23, 2015, entire document.

International Preliminary Report Patentability the International Preliminary Examining Authority dated Aug. 31, 2016 of International Application No. PCT/AU2015/000428 filed Jul. 23, 2015, entire document.

Supplementary European Search Report of the European Patent Office dated Jan. 31, 2018 of European Application No. 15824908.6 filed on Jul. 23, 2015.

* cited by examiner

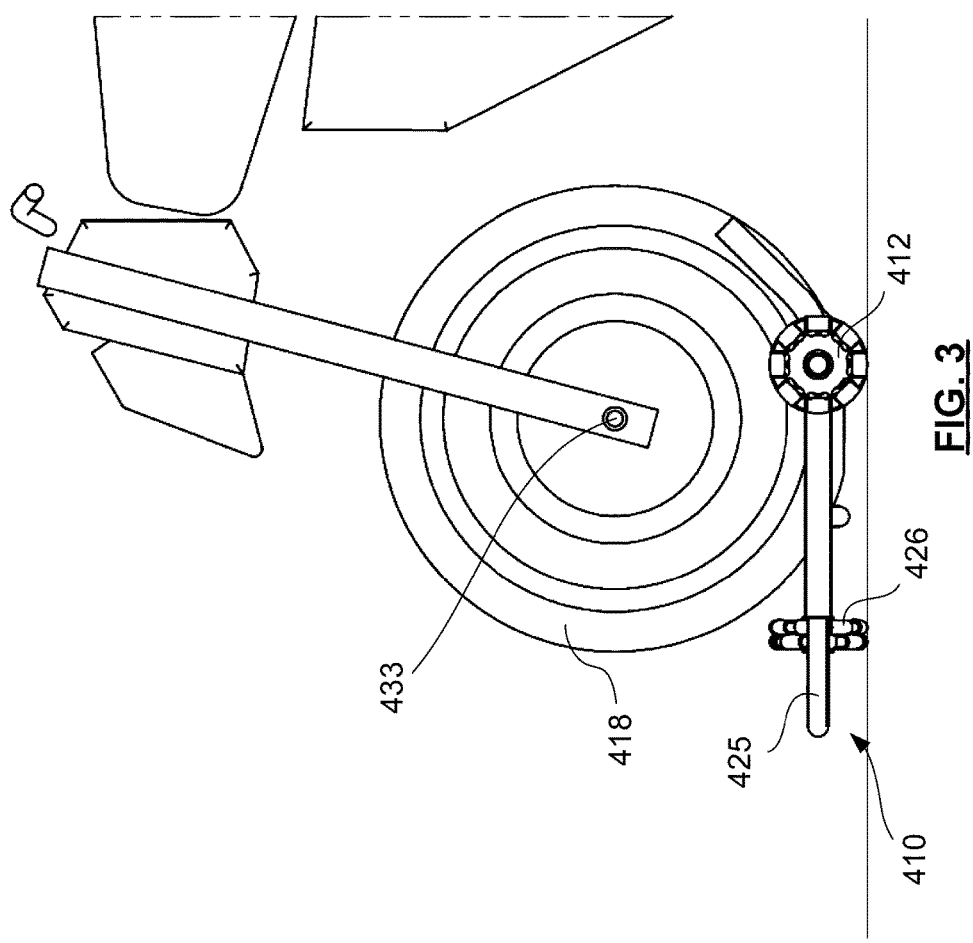

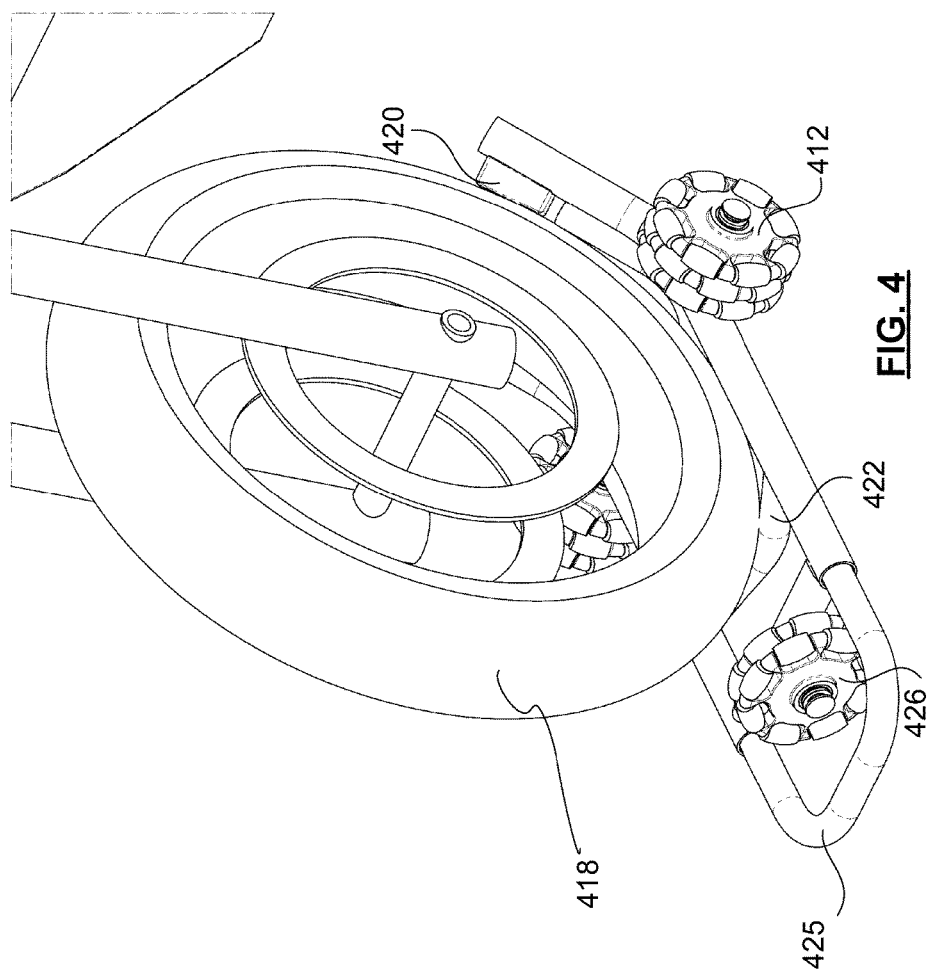

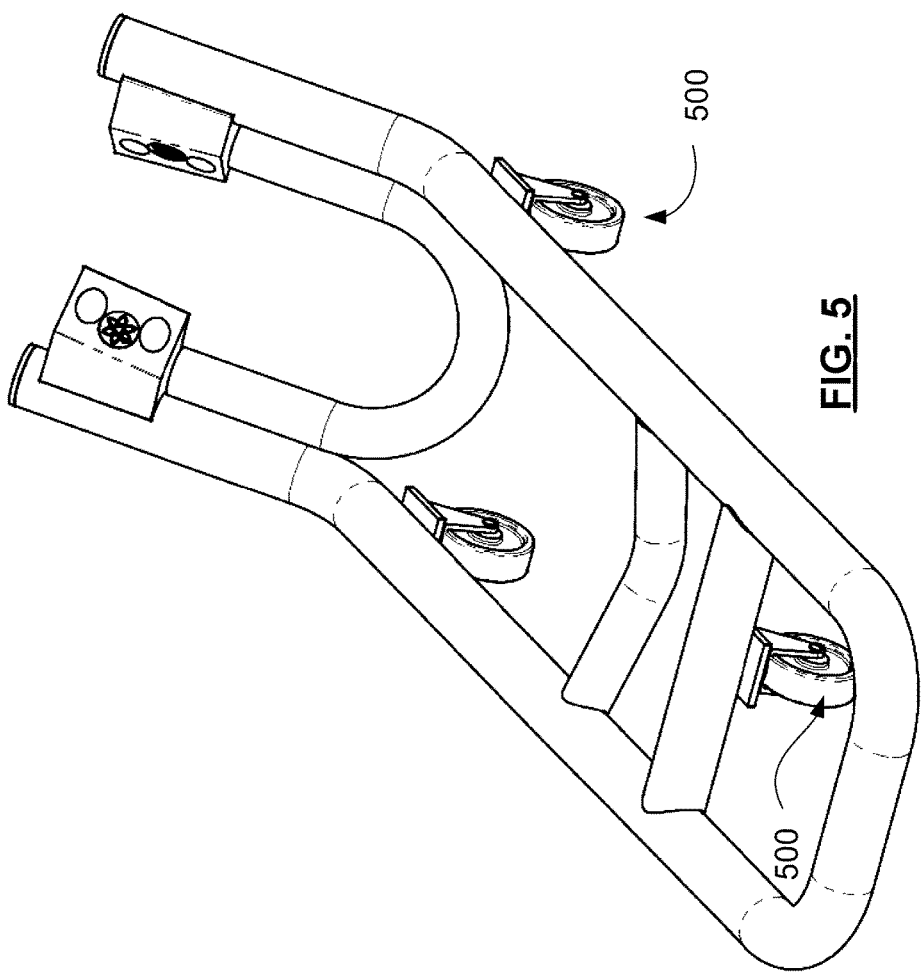

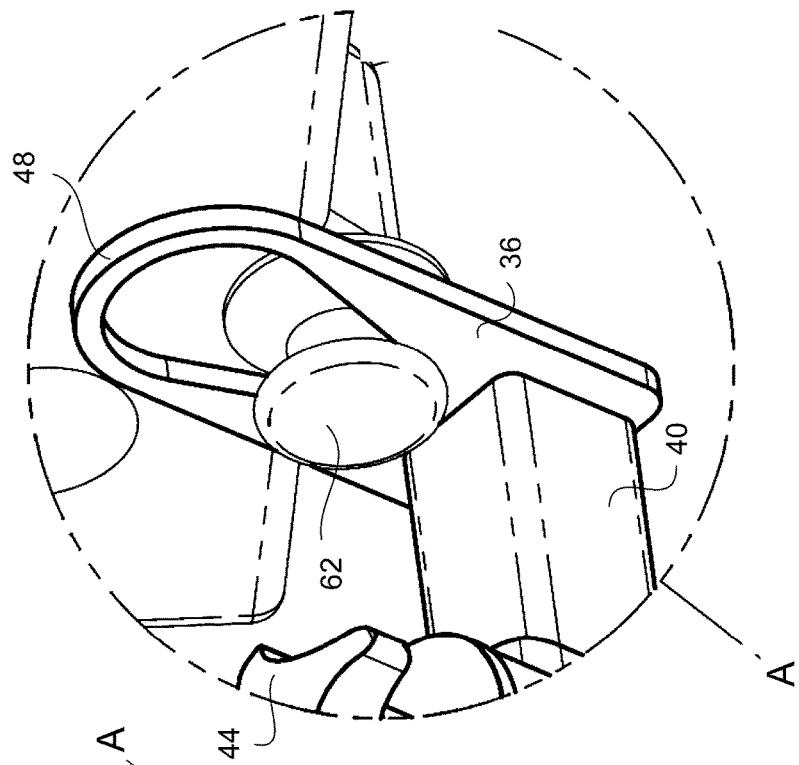
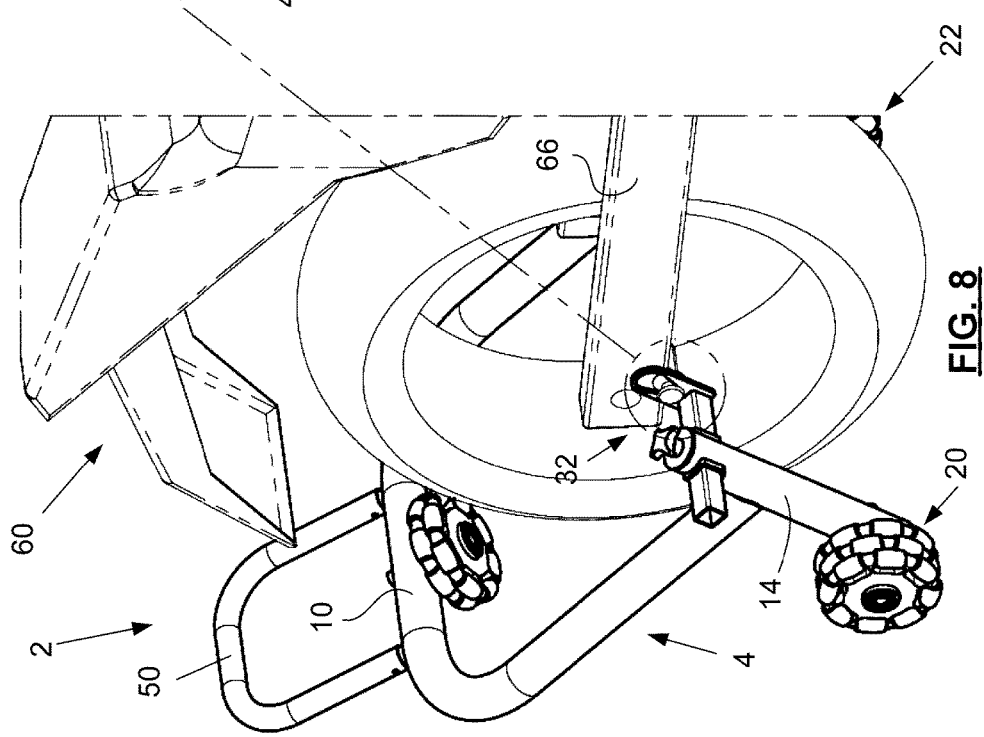

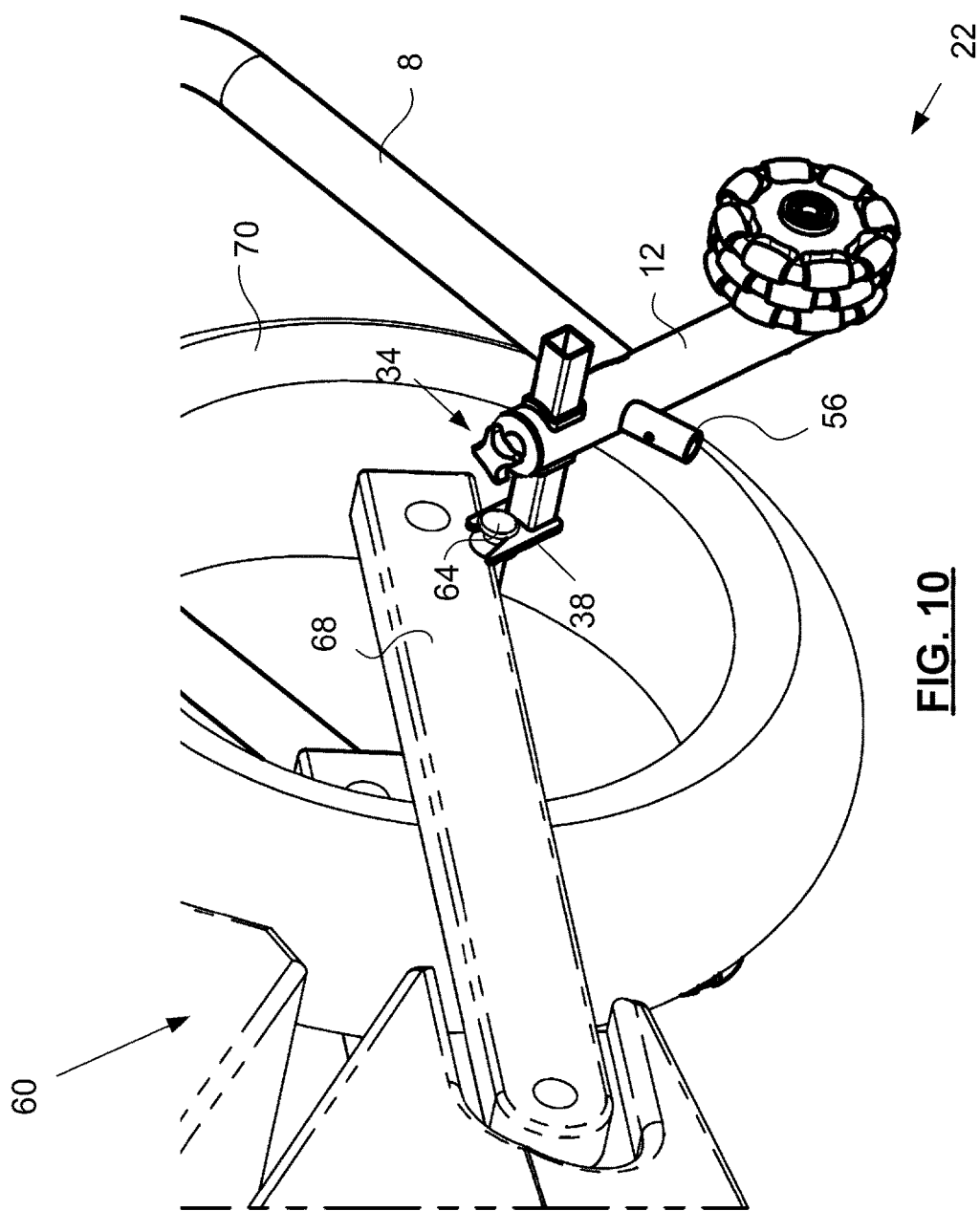

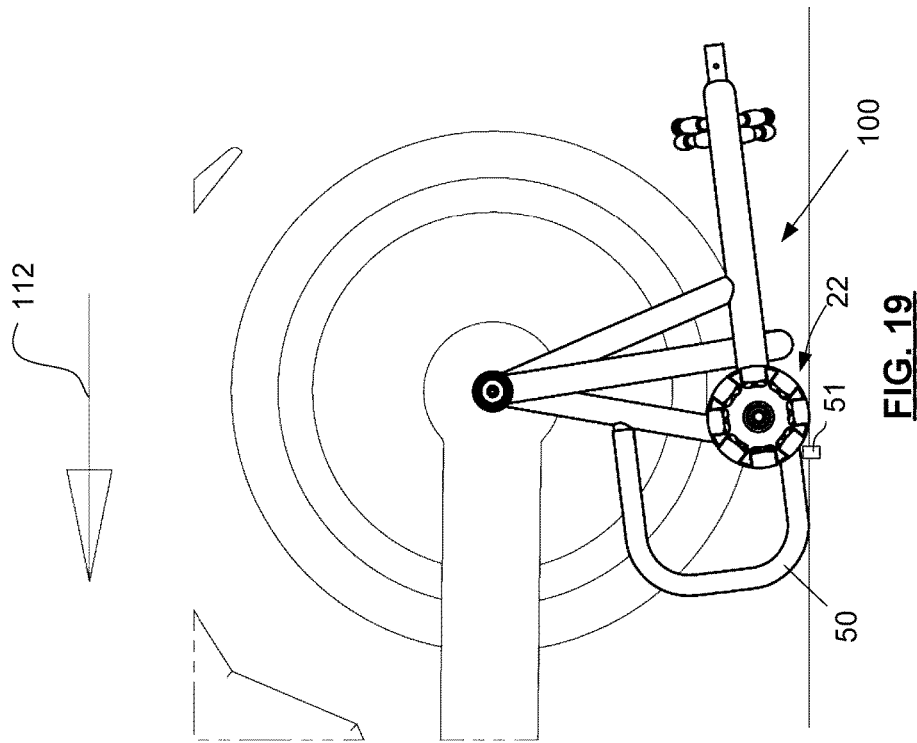
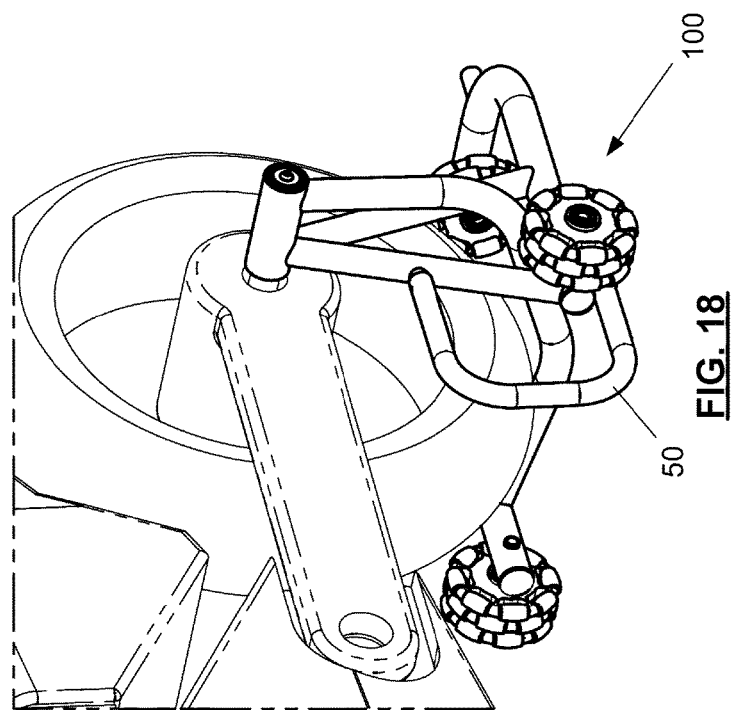

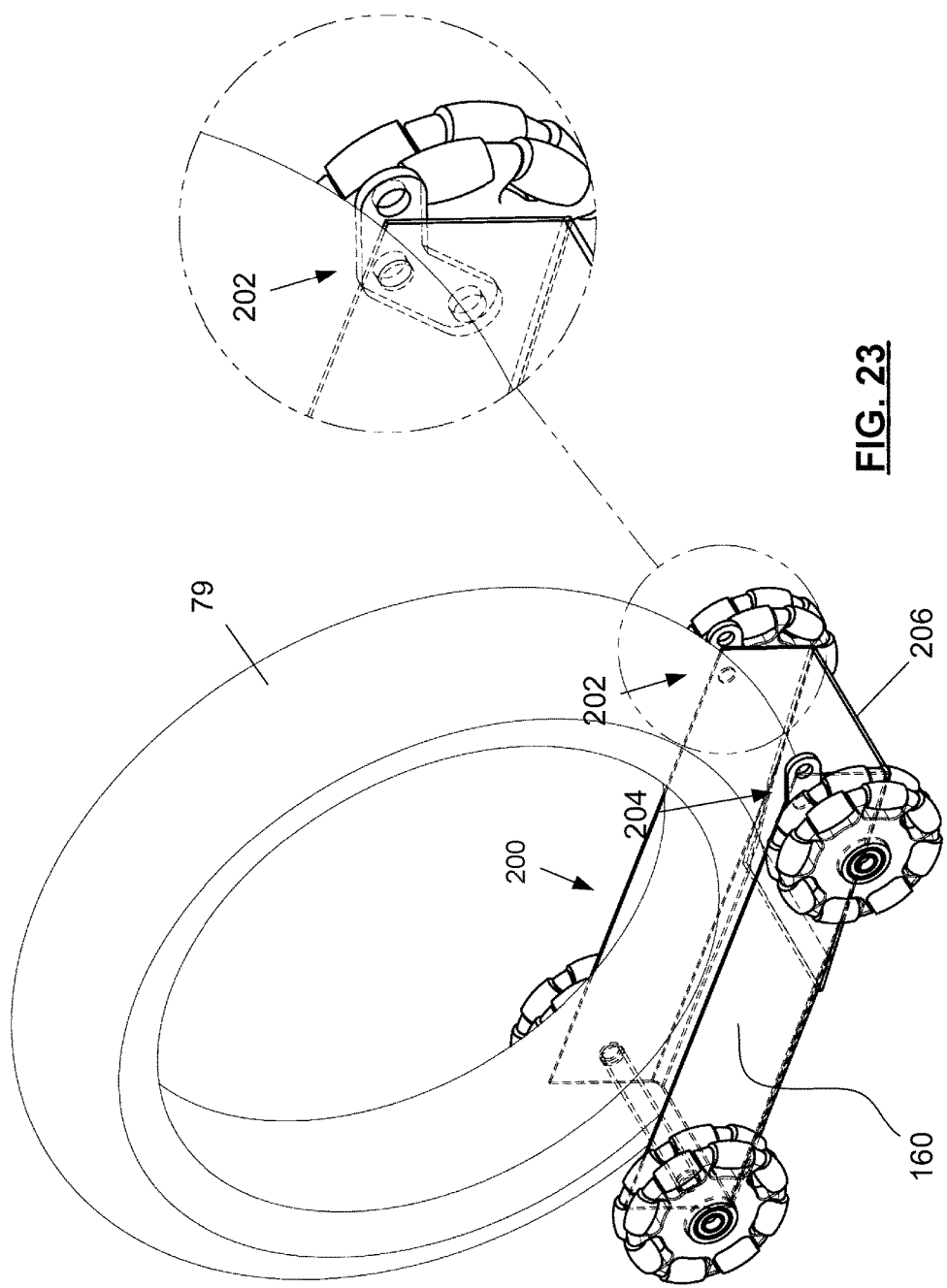

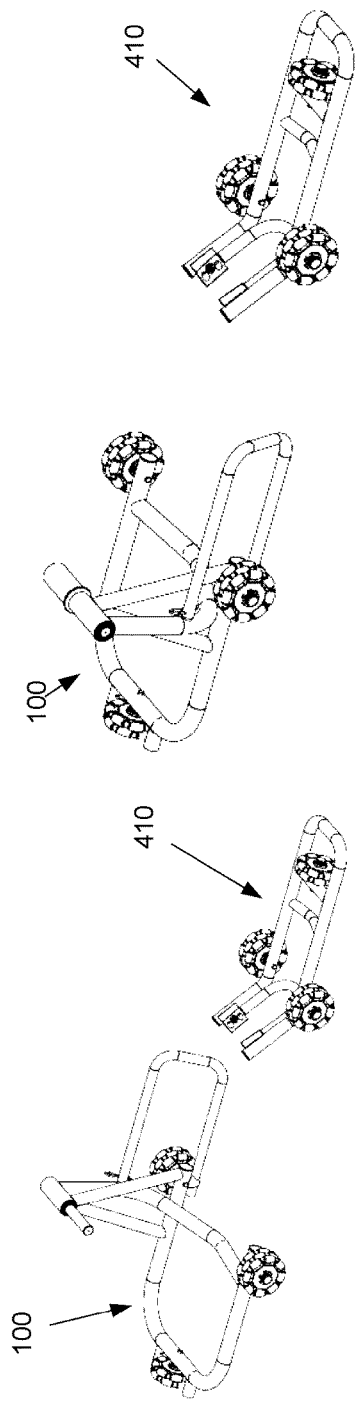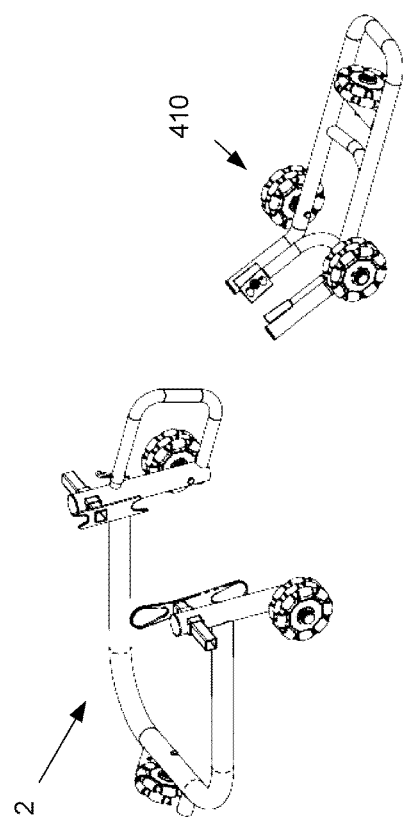
FIG. 24A
FIG. 24B
FIG. 24C

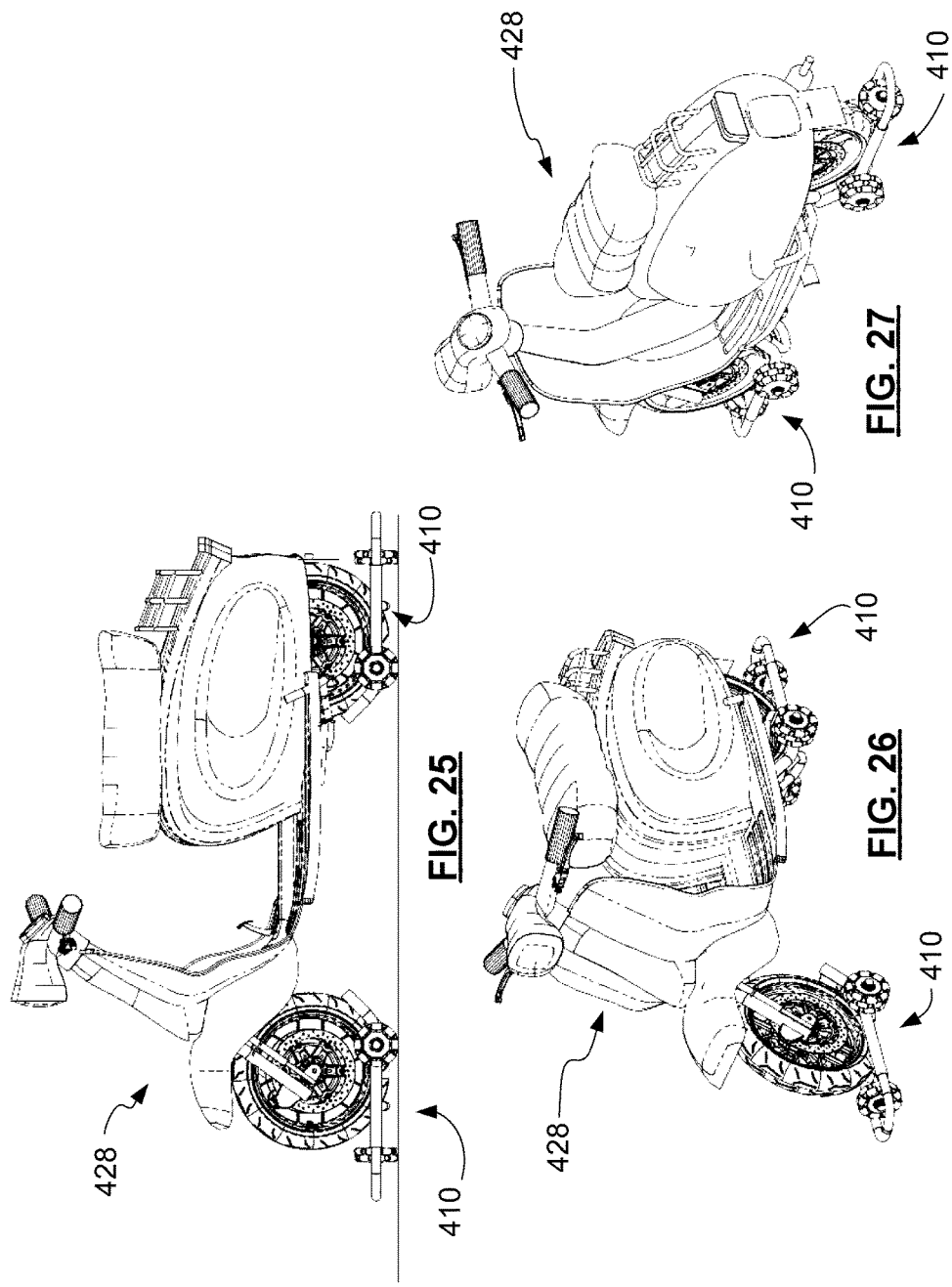

APPARATUS FOR MANEUVERING PARKED MOTORCYCLES AND MOTOR SCOOTERS

TECHNICAL FIELD

The present invention relates to apparatus for assisting in the maneuvering of parked or stationary motorcycles or motor scooters. Such an apparatus is often referred to as a "dolly".

BACKGROUND

Any references to methods, apparatus or documents of the prior art are not to be taken as constituting any evidence or admission that they formed, or form part of the common general knowledge.

Owners of motorcycles and scooters and persons involved in the motorcycle industry (for example, those in workshops and showrooms) have long been presented with the problem of the difficult maneuvering of the vehicles for storage, repair and maintenance, or display. Motorcycles and motor scooters are large, heavy, unwieldy, unstable, and have a limited turning circle which makes their maneuvering a difficult, time consuming, and dangerous task. A motorcycle or scooter often needs to be placed in a confined space (for example, in the corner of a domestic garage or storage room) or maneuvered in a confined area (for example, a motorcycle showroom or workshop).

Various dollies are known for maneuvering parked motorcycles and motor scooters but these suffer from disadvantages including their large size, their heavy weight, their complex use and many give rise to storage problems of their own.

For instance, it is known to provide a dolly comprising an elongate steel U shaped channel. Small wheels are placed under the channel. The motorcycle can be pushed onto the channel with the front and rear wheels being in the channel. A lateral extension on the channel supports the kickstand. The motorcycle is therefore held upright by the kickstand. This is an example of a large and heavy dolly which is difficult to store when not required.

Another type of dolly raises the entire motorcycle off the ground by lifting directly under the underside of the frame. These dollies are large, heavy, complex, and work with only a limited number of motorcycles—those without bodywork, and without obstructions below the frame (for example, engine or exhaust components).

Another type of dolly raises the entire motorcycle off the ground by connecting to the motorcycle frame on one side, and lifts using an arrangement of levers and struts. These dollies are large, heavy, complex, and require a modification to the motorcycle frame.

Centre stand dollies are known for motorcycles having a centre stand but maneuvering such supported motorcycles is restricted as the front wheel of the motorcycle remains on the ground. Additionally, few modern motorcycles are equipped with a centre stand.

It is an object of the present invention to provide an improved dolly or dollies for maneuvering of parked or stationary motorcycles or motor scooters and which can overcome at least some of the abovementioned disadvantages or provide a useful or commercial choice in the marketplace.

SUMMARY OF THE INVENTION

According to a first aspect of the present invention there is provided a tyre interfacing dolly adapted to lift and support a tyre of a motorcycle or motor scooter off the ground, the dolly comprising:

axially aligned wheels, a frame which has a front frame part forward of the wheels and a rear frame part behind the wheels, the front frame part having an open end such that the motorcycle of motor scooter tyre can locate in the open end, at least one tyre supporting member adjacent the open end and adapted to support the tyre when the front frame part is lifted to lift the tyre off the ground and release the tyre when the front frame part is lowered, and, at least one wheel on the rear frame part.

A non-limiting embodiment of this aspect of the invention is illustrated in FIGS. 1-5.

An advantage of this aspect of the invention is that the dolly interfaces with the tyre in a manner that need not require any fastening to the frame or suspension components of the motorcycle or motor scooter.

Suitably, the front frame part and the rear frame part are rigidly connected and angled relative to each other whereby lowering of rear frame part causes said lifting of front frame part. The angle between the frame parts may be between 90-170° and typically about 135°. These parts may be formed separately and connected or formed from integral parts. The angle between the parts may be varied if desired, for instance, using an angled plate and then locked together at a desired angle.

The forward frame part may have an open end suitably at least partially defined by a pair of parallel (or otherwise orientated) spaced apart frame members. The spacing between the frame members is suitably such that the dolly can be wheeled into position about a tyre with the tyre locating between the frame members, or the motorcycle/scooter may be rolled forward or backward to engage between the frame members.

The frame may comprise separate members attached to each other by any suitable means. The frame may be formed from a single piece—such as by a stamping and bending process, or molding process. The frame may be made of any suitable material such as metal, plastics, composite materials, layered materials and the like. The frame may comprise telescoping or other types of length adjusting parts.

Suitably, the at least one tyre supporting member is ramped and is suitably sized and shaped to allow the dolly to be wheeled into an initial position without needing to lift the wheel of the motorcycle. The at least one tyre supporting member may be removeably mounted to the dolly to enable the member to be replaced with members of a different size or shape to fit a different tyre profile. A pair of tyre supporting members is preferable provided.

Suitably, the wheels each include peripheral rotatable ground contact members for motion in any horizontal direction. The wheels may comprise multi-directional wheels which can be called omni-directional wheels. The wheels may comprise one or more rollers. However rollers may be less maneuverable than omni-directional wheels. The wheels may be removeably mounted to or relative to the frame.

Suitably, the rear frame part includes a location stop for the tyre.

The dolly is suited for use with the front wheel of the motorcycle or motor scooter or other suitable two wheeled apparatus. There may be circumstances where there is an advantage in supporting the rear wheel, or the rear and front wheels with this type of dolly, but at least the front wheel should be supported by this dolly.

The dolly can be used in combination with one or more second dollies to support both wheels of a motorcycle or motor scooter in a manner more convenient than hitherto possible. The one or more second dollies is typically used to support the rear wheel of the motorcycle or motor scooter. Suitably, a single second dolly is used for the rear wheel.

Various types of second dollies are envisaged.

In one form there is provided a second dolly (which can be seen as a "double sided dolly") comprising
a frame;
first and second dolly wheels coupled to a forward end of the frame and arranged for placement on opposite sides of the motorcycle; and
a motorcycle engagement assembly coupled to the frame; wherein the first and second dolly wheels each include peripheral rotatable ground contact members for motion parallel to a major axis of each wheel.

The first and second dolly wheels are coaxial and aligned with the major axis parallel with the axes of the motorcycle wheels.

Preferably the frame includes first and second arms separated by a spacing member. In a preferred embodiment of the invention the spacing member is integrally formed with the first and second arms.

A third wheel is mounted to the spacing member and includes peripheral rotatable ground contact members for motion parallel to the major axis of the wheel.

Preferably the frame further includes first and second uprights wherein the first and second arms are coupled respectively to the first and second uprights.

An example of this type of "double sided" dolly, is illustrated in FIGS. 6-14 at least.

In a preferred embodiment of the invention the first and second dolly wheels are coupled to lower portions of the first and second uprights respectively.

For example, the first and second dolly wheels may be coupled to the first and second uprights by stub axles which extend therefrom.

Alternatively the first and second dolly wheels may be coupled to end portions of the first and second arms respectively.

For example, the first and second dolly wheels may be coupled to the end portions of the first and second arms by stub axles.

In a first embodiment of this type of dolly, the motorcycle engagement assembly comprises first and second motorcycle engagement sub-assemblies respectively coupled to upper portions of the first and second uprights wherein said first and second sub-assemblies are arranged for engagement of opposed sides of the motorcycle respectively.

Alternatively, in a second embodiment of the invention the motorcycle assembly may comprise a stem fast with the frame, the stem being arranged for insertion into an axial recess of a rear wheel of the motorcycle. This type of dolly can be seen as a "single sided dolly".

Preferably the stem is coupled to the first arm and to the second arm. For example, in a preferred embodiment of the invention the stem is mounted to the first arm by a pair of angled bracing members and to the second arm by a transverse bracing member.

It is preferred that the dolly includes a handle for assisting in rotating the dolly about the first and second dolly wheels in use. The handle preferably extends from the spacing member of the frame.

Preferably the handle is detachable from the spacing member of the frame.

It is preferable that the dolly includes an anti-tipping arrangement. For example, the anti-tipping arrangement may comprise an anti-tipping member that assumes a forwardly extending position wherein it extends forward of the first and second dolly wheels.

In a preferred embodiment this type of dolly a forward portion of the frame is arranged to engage the handle whereby upon the handle being engaged by said forward portion the handle acts as the anti-tipping member to prevent inadvertent tipping of the motorcycle forward and into an unstable condition.

The anti-tipping arrangement may be configured to for placement of the anti-tipping member in a stowed position or in the forwardly extending position.

For example, the anti-tipping assembly may telescopically extend the anti-tipping member from the stowed position to the forwardly extended position.

Alternatively the anti-tipping assembly may include a hinge for bringing the anti-tipping member from the stowed position to the forwardly extended position.

A ground contact member, such as a wheel or roller may be mounted to a remote end of the member for making contact with the ground when the member is in the forwardly extended position should the motorcycle tip forward.

On the "double-sided" dolly as illustrated in FIGS. 6-14, the first and second motorcycle engagement sub-assemblies preferably comprise opposed cradles for respectively supporting handling stubs of the motorcycle. The first and second motorcycle engagement sub-assemblies can be arranged for adjustment of spacing therebetween.

For example, the opposed cradles may extend from inner ends of respective lateral beams which are positionable relative to the first and second uprights. In a preferred embodiment the lateral beams penetrate through the first and second uprights. These lateral beams/shafts may be known as "outriggers".

The lateral beams may be retained in a desired position by respective fasteners. For example, the respective fasteners may comprise hand operated screws or clamps. Alternatively, the lateral beams may be retained by a friction device where the friction device is provided by a spring or similar member. This may be called a "friction leaf spring mechanism".

One of the opposed cradles may be arranged to capture its respective motorcycle handling formation. For example, the at least one cradle may include a capture member such as an arcuate member that over arches the cradle. Preferably the capture member is formed integrally with the remainder of the cradle. The capture member makes engaging the dolly with the motorcycle easier and safer by not requiring the operator to balance the motorcycle whilst engaging the dolly. This may be called a "closed loop outrigger".

The dolly as previously described can be used with a rearward portion of a motorcycle and a further dolly can be provided for supporting a forward wheel of the motorcycle.

Another type of second dolly may comprise:
a frame;
first and second dolly wheels coupled to a forward end of the frame and arranged for placement on opposite sides of the motorcycle;
a motorcycle engagement assembly coupled to the frame; and opposed cradles for supporting motorcycle handling formations of the motorcycle wherein at least one of the cradles is arranged to capture its respective motorcycle handling formation.

For example, the at least one cradle may include a capture member such as an arcuate member that over arches the remainder of the cradle and which may be integrally formed therewith.

Yet another type of second dolly may comprise a cart like structure for supporting a wheel of the motorcycle wherein wheels of the cart include peripheral rotatable ground contact members for motion parallel to a major axis of each wheel, and in combination with the rotation of the major part of the wheel about its axis, allow for horizontal movement in any direction.

A coupling point for each of the wheels is located above a support platform of the cart.

The support platform of the cart may include a formation for locating the wheel of the motorcycle. For example, the support platform may include a cutout for receiving a portion of the wheel.

The cart may include a ramp for assisting in rolling the wheel of the motorcycle onto the platform. Alternatively, the cart may include wheel mounting assemblies that are arranged to raise and lower a pair of the wheels of the cart in in order to raise and lower an edge of the platform to thereby assist in progressing the wheel of the motorcycle onto the platform.

Yet another type of second dolly may comprise:
a frame;
first and second dolly wheels coupled to a forward end of the frame and arranged for placement on opposite sides of the motorcycle; and
a motorcycle engagement assembly coupled to the frame; and
an anti-tipping assembly for preventing inadvertent tipping of the dolly once loaded.

The anti-tipping assembly may comprise an anti-tipping member that assumes a forwardly extending position wherein it extends forward of the first and second dolly wheels. A forward portion of the frame may be arranged to engage the handle whereby upon the handle being engaged by said forward portion the handle acts as the anti-tipping member to prevent tipping of the motorcycle. The anti-tipping assembly may be configured to for placement of the anti-tipping member in a stowed position or in the forwardly extending position.

For example, the anti-tipping assembly may telescopically extend the anti-tipping member from the stowed position to the forwardly extended position.

Alternatively the anti-tipping assembly may include a hinge for bringing the anti-tipping member from the stowed position to the forwardly extended position. A ground contact member may be mounted to a remote end of the member for making contact with the ground when the member is in the forwardly extended position should the motorcycle tip forward.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIGS. 1-5 "Tyre Interfacing" Dolly

FIG. 1 depicts a dolly according to a further aspect of the invention.

FIGS. 2-5 depict use of the dolly of FIG. 1 to support a motorcycle front wheel.

FIG. 5 depicts the dolly of FIGS. 1-4 but with more traditional caster wheels instead of omni-directional wheels.

FIGS. 6-14 "Double Sided" Dolly

FIG. 6 is a first view of a dolly according to a first embodiment of the present invention in a first configuration.

FIG. 7 depicts a variation of the dolly of FIGS. 6 and 7.

FIG. 8 is a view of one side of the dolly of FIG. 1 in use—the closed loop outrigger.

FIG. 9 is detail of a portion of FIG. 8.

FIG. 10 a view of a second side of the dolly of FIG. 6 in use.

FIG. 11 is a diagram showing initial stages of use of the dolly of FIG. 6

FIG. 12 is a diagram showing the dolly of FIG. 6 in use with a rear of a motorcycle supported thereon in a stable over center configuration.

FIG. 13 is a diagram showing the dolly of FIG. 6 in use with handle located on a forward portion of the dolly and reacting with the ground to prevent inadvertent tipping of the dolly.

FIG. 14 is a further view of the dolly in the state shown in FIG. 13.

FIGS. 15-19C "Single Sided" Dolly

FIG. 15 depicts a "single sided" dolly.

FIG. 16 depicts the dolly of FIG. 15 in a second configuration.

FIG. 17 is a diagram showing initial stages of use of the dolly of FIG. 15.

FIG. 18 shows the dolly of FIG. 16 in use supporting a rearward portion of the motorcycle.

FIG. 19 is a diagram showing the dolly of FIG. 16 in use with handle located on a forward portion of the dolly and reacting with the ground to prevent inadvertent tipping of the dolly.

FIG. 19C illustrates another anti-tipping assembly according to a further embodiment of the present invention.

FIGS. 20-23 "Cart" Dolly

FIG. 20 depicts a cart dolly for a wheel of a motorcycle.
FIG. 21 shows the cart of FIG. 20 in use.
FIG. 22 depicts a second embodiment of a cart for wheel of a motorcycle.
FIG. 23 shows the cart of FIG. 22 in use supporting a wheel of a motorcycle.

FIGS. 24-27 Combination of Front and Rear Dollies

FIGS. 24A-C, and 25-27 depict combinations of dollies for maneuvering a motorcycle and including the dolly of FIGS. 1-5

DETAILED DESCRIPTION OF PREFERRED EMBODIMENTS

Figure 1:
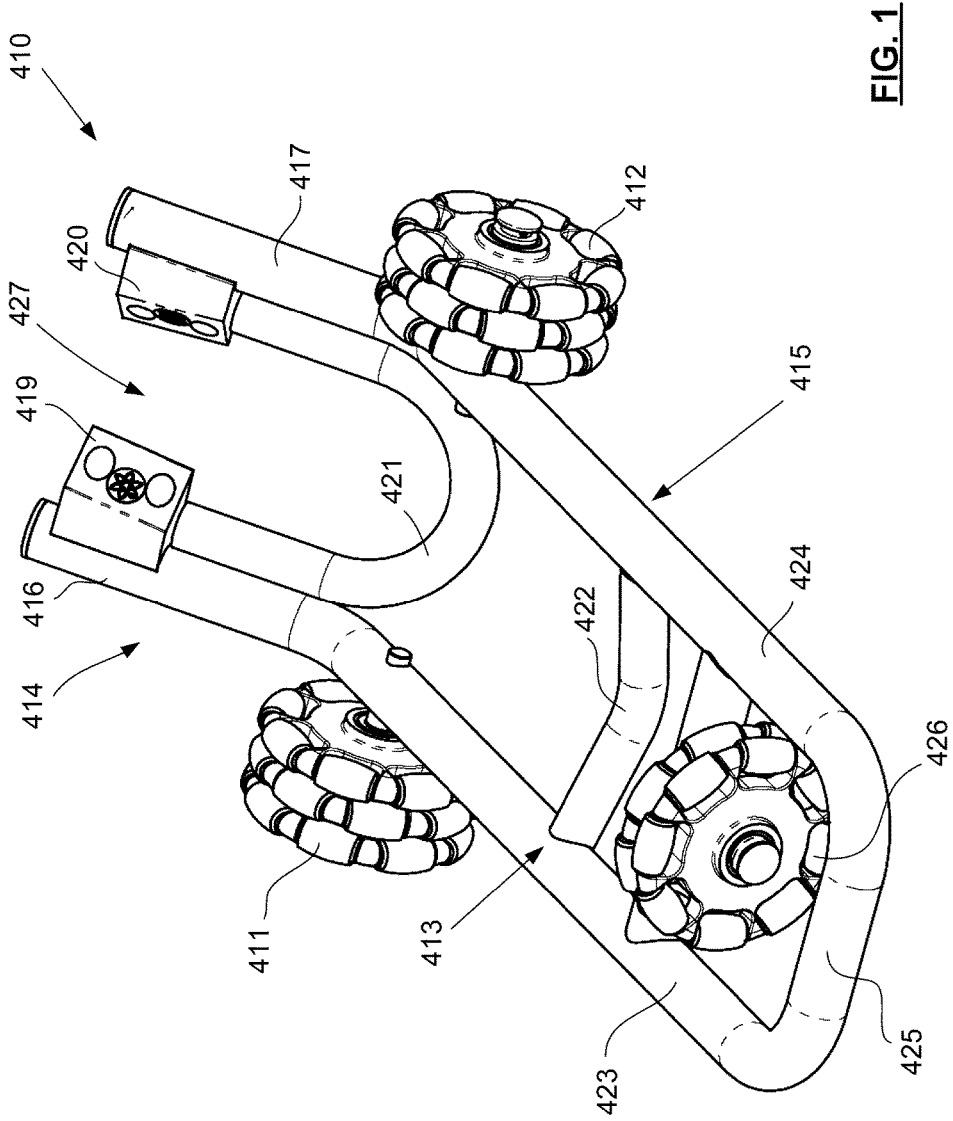

In the embodiments of the invention described below, the wheels are preferably all of an omni-directional type, an example of which is a "Rotacaster" wheel manufactured by Rotacaster Wheel Pty Limited having the Australian Business Number ABN 37 100 342 256.

Referring initially to FIGS. 1-5, there is illustrated a first embodiment of the invention which comprises illustrate a dolly 410 which can be used to support the front or rear wheel of a motorcycle or motor scooter or other two wheeled vehicle that can benefit from this type of dolly.

Dolly 410 has a pair of axially aligned wheels 411 412 supported by a frame/chassis 413. The frame has a frame part 414 forward of the wheels and a frame part 415 behind the wheels. Forward frame part 414 has an open end 427 partially defined by a pair of parallel or otherwise aligned spaced apart frame arms 416, 417. The spacing between the frame arms is such that the "raised dolly" (see FIG. 2) can be wheeled into position about a tyre 418 with the tyre locating between the frame arms 416,417 (alternatively, the motorcycle/scooter can be rolled into position between the frame arms).

Ramped tyre supporting members 419,420 are positioned on arms 416,417. These members are sized and shaped to allow the dolly to be wheeled into the initial position (see FIG. 2) without needing to lift the wheel of the motorcycle and when the tyre is in position (see FIG. 2A) the members are closely spaced from the tyre. Members 419, 420 are removeably fixed to the respective frame arms 416,417 and can be replaced with larger or smaller members to fit the tyre profile. Alternatively, in another embodiment of the invention the gripping members may be formed integrally with the arms 416, 417.

The rear part 415 of the frame contains frame arms 423, 424 which are continuous with frame arms 416, 417. An interconnecting member 422 is provided which provides rigidity to the frame and provides a location stop and support for the tyre.

Figure 2:
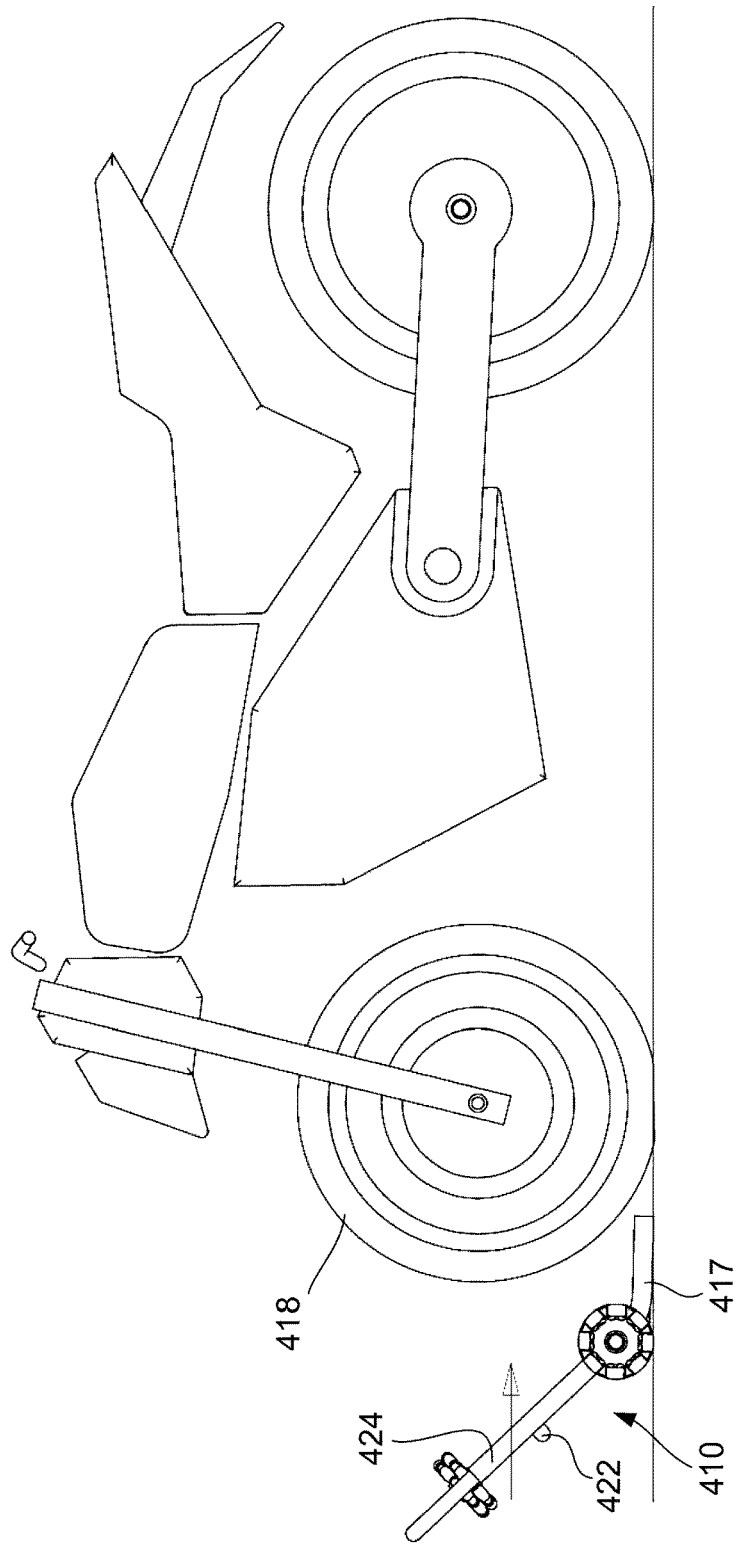
Figure 2A:
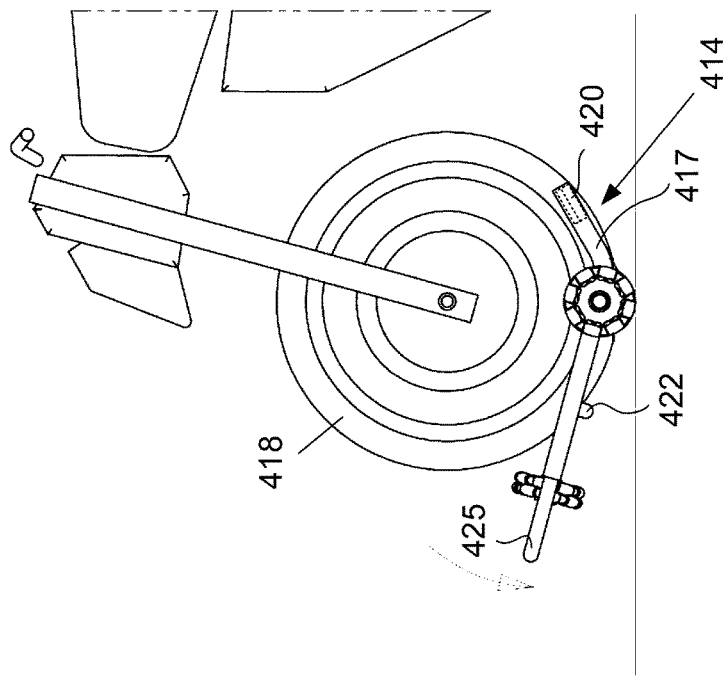
Figure 2B:
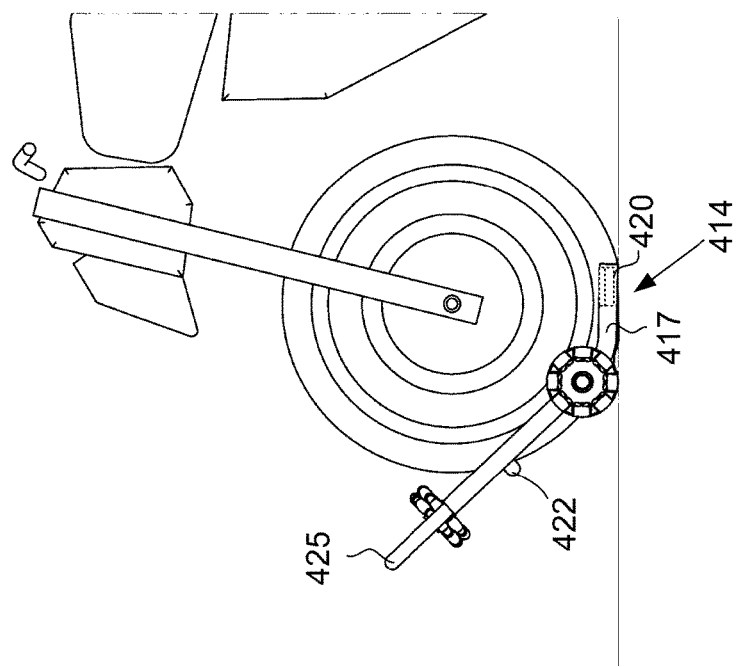

In use, the dolly 410 is positioned in the tyre engaging position as illustrated in FIG. 2A. The dolly is then pushed down, for instance, by pushing down on the small extension member (handle) 425 as indicated in FIG. 2B. During this process, the front part 414 of the frame will lift. As it does, the motorcycle/scooter tyre will wedge between the gripping members 419,420 and the wheel will be lifted. As the wheel is freewheeling and as the gripping members 419,420 wedge against the wheel tyre and as the pushing down action creates a small forward motion to the dolly, all these actions cause the front of the dolly to lift and move under the wheel to the position illustrated in FIG. 3.

In this position, the wheels 411, 412 pass under the centre position of the motorcycle wheel axle 433. The tyre is now supported between members 419,420 and, 422 and no longer contacts the floor.

The "overcentre" position of the wheel places the wheel weight on the rear part 415 of the dolly which prevents the dolly from returning to the position of FIG. 2A.

When in the "use" position as illustrated in FIGS. 3 and 4, the third wheel 426 of the dolly is floor engaging. The wheel supporting dolly 410 is free to move in all directions by virtue of the omni-directional wheels.

The use of omni-directional wheels in all locations 411, 412 and 426 permits the movement of the dolly in any horizontal direction.

Extension member (handle) 425 may be retractable within members 423 and 424 and can have an extended position and a retracted position. The extended position provides mechanical advantage when lifting and the retracted position provides for conservation of space when maneuvering the motorcycle/scooter. However, the handle can also be fixed and non-extendible.

FIG. 5 illustrates a variation of the dolly of FIGS. 1-4 where the omnidirectional wheels have been replaced with more conventional castor wheels 500.

An important advantage of the dolly 410 (which might also be called "a tyre lifting device") is that it interfaces with the motorcycle/motor scooter tyre, rather than the forks, fork clamps, or any other part of the motorcycle/scooter chassis or body. No initial fastening or attachment is required.

The dolly may be used by itself or in conjunction with a rear wheel dolly, a Centre Stand device, or a Side Stand Device. The dolly may hold the motorcycle/motor scooter in an upright position by itself. The dolly may be used on the rear wheel to provide maneuverability for the rear of the motorcycle/scooter. Dollies may be used simultaneously on the front wheel and rear wheel for added maneuverability.

Referring to FIGS. 25-27, dolly 410 can be used on the front wheel and/or the rear wheel of a scooter which again illustrates the versatility of the dolly. Furthermore, the dolly 410 is compact and lightweight in design and can therefore be easily used and also easily stored when not required. This is in contrast with large heavy wheeled dollies which support the entire motorcycle/scooter and which are more difficult to manoeuvre and store when not required.

Thus, another advantage of the invention is the ability to use various separate easy to use dollies in any suitable combination or in isolation to provide great versatility in supporting motor scooters, motorcycles and the like.

The dolly as described above can be used to support one wheel of a motorcycle or motor scooter and a second different dolly can be used to support the other wheel of a motorcycle or motor scooter.

FIGS. 6-23 illustrate various other "second" dollies that can be used with the dolly as described above to allow a parked motorcycle or motor scooter to be easily maneuvered and which are easy to use and store when not required. Generally (but not always), the dolly as described above will be used on the front wheel and the second dolly will be used on the rear wheel.

Referring now to FIGS. 6, 6A, 7 and 7A, there is depicted a first type of "second" dolly 2 to support the rear wheel of a motorcycle or motor scooter. This can be seen as a double sided dolly as it supports each side of the motorcycle.

The dolly 2 includes a frame 4 having first and second arms 6, 8 separated by a spacing member 10. The first and second arms 6, 8 are integrally formed with a spacing member 10 therebetween. The first and second arms 6, 8 and the spacing member 10 are, in the presently described embodiment, formed of bent steel tubing.

The frame 4 further includes first and second uprights 12, 14 which are fastened to forward ends of arms 6, 8. Stub axles 16, 18 extend laterally from lower portions of the first and second uprights 12, 14, respectively. The stub axles 16, 18 support first and second dolly wheels 20, 22.

The first and second arms 6, 8 and hence the uprights 12, 14 are sufficiently spaced apart for placement on opposite sides of a rearward end of the motorcycle.

The first and second dolly wheels 20, 22 each include peripheral rotatable ground contact members in the form of rollers 24 for motion in direction 26, i.e. parallel to the major axis 28 of each wheel. Consequently, the dolly wheels 20, 22 are able to roll, by means of rollers 24, in direction 26 and also in the conventional manner in direction 30 by rotating about the stub axles 16, 18 and in any direction between axis 26 and 30 (see FIG. 6). Such wheels can be seen as omni-directional wheels and may be purchased from Rotacaster Wheel Limited of Unit 2, 2 Revelation Close Tighes Hill, NSW, 2297, Australia.

A third, rear dolly wheel 23 may also be provided which is mounted to a stub axle 25 that extends from the spacing member 10. The third dolly wheel 23 is also of a type that includes peripheral rotatable ground members in the form of rollers 24.

This combination of the omni-directional wheels 20, 22 and 23 allow the dolly to move in any horizontal direction.

The dolly 2 further comprises first and second motorcycle engagement sub-assemblies 32, 34, respectively coupled to upper portions of the first and second uprights 14, 12. In use the first and second motorcycle engagement sub-assemblies 32, 34 engage handling pins or "stubs" located on opposed sides of the motorcycle.

The first and second motorcycle engagement sub-assemblies 32, 34 include opposed cradles 36, 38 for respectively supporting the motorcycle's handling pins.

The opposed cradles 36, 38 extend from inner ends of respective lateral shafts 40, 42 which slide in sleeves 44, 49 formed through the first and second uprights 14, 12.

Figure 6:
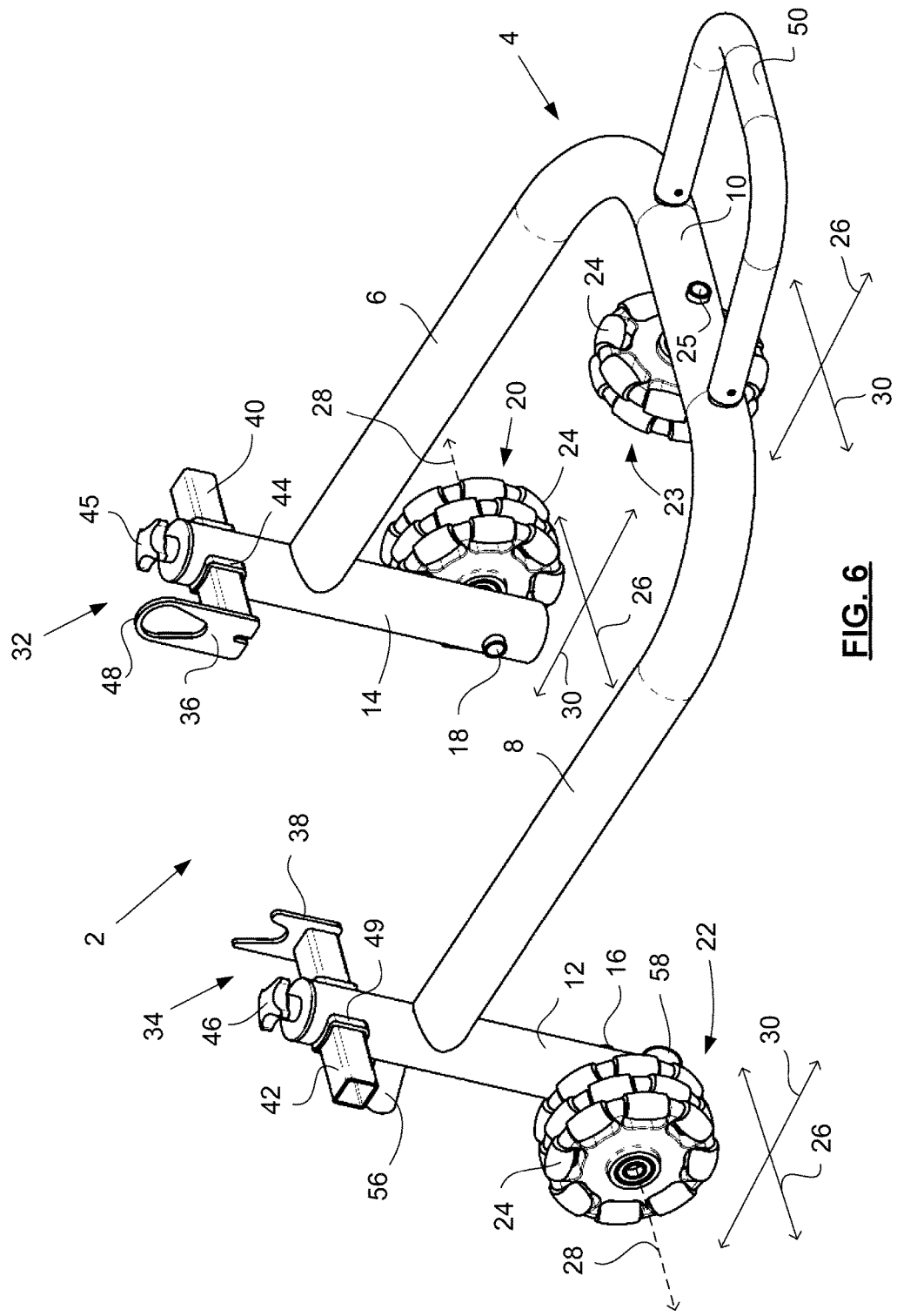

The lateral shafts/beams 40, 42 may be retained in a desired position by respective fasteners in the form of hand turned clamps 45, 46 (see FIG. 6). Alternatively, the respective fasteners may comprise other arrangements such as spring loaded retainers for example in FIG. 7. FIG. 7A illustrates the arrangement of a suitable spring loaded retainer which makes use of a spring 47 for placement between the lateral shafts 40, 42 and the sleeves 44, 49.

The spring 47 provides sufficient friction between the shafts and their respective sleeves to retain the shafts at the user selected positions while allowing for the user to easily make adjustments as desired.

One of the opposed cradles, i.e. the first cradle 36 may be suitably provided with a capture member 48 formed over the cradle 36 to capture a respective motorcycle handling pin in use. Optionally, cradle 36 may be of the open ended design, the same as cradle 38.

It is preferred that the dolly includes a handle 50 for assisting in rotating the dolly about the first and second dolly wheels 20, 22 in operations. The handle 50 extends from the rear of the spacing member 10 of the frame 4.

Figure 6A:
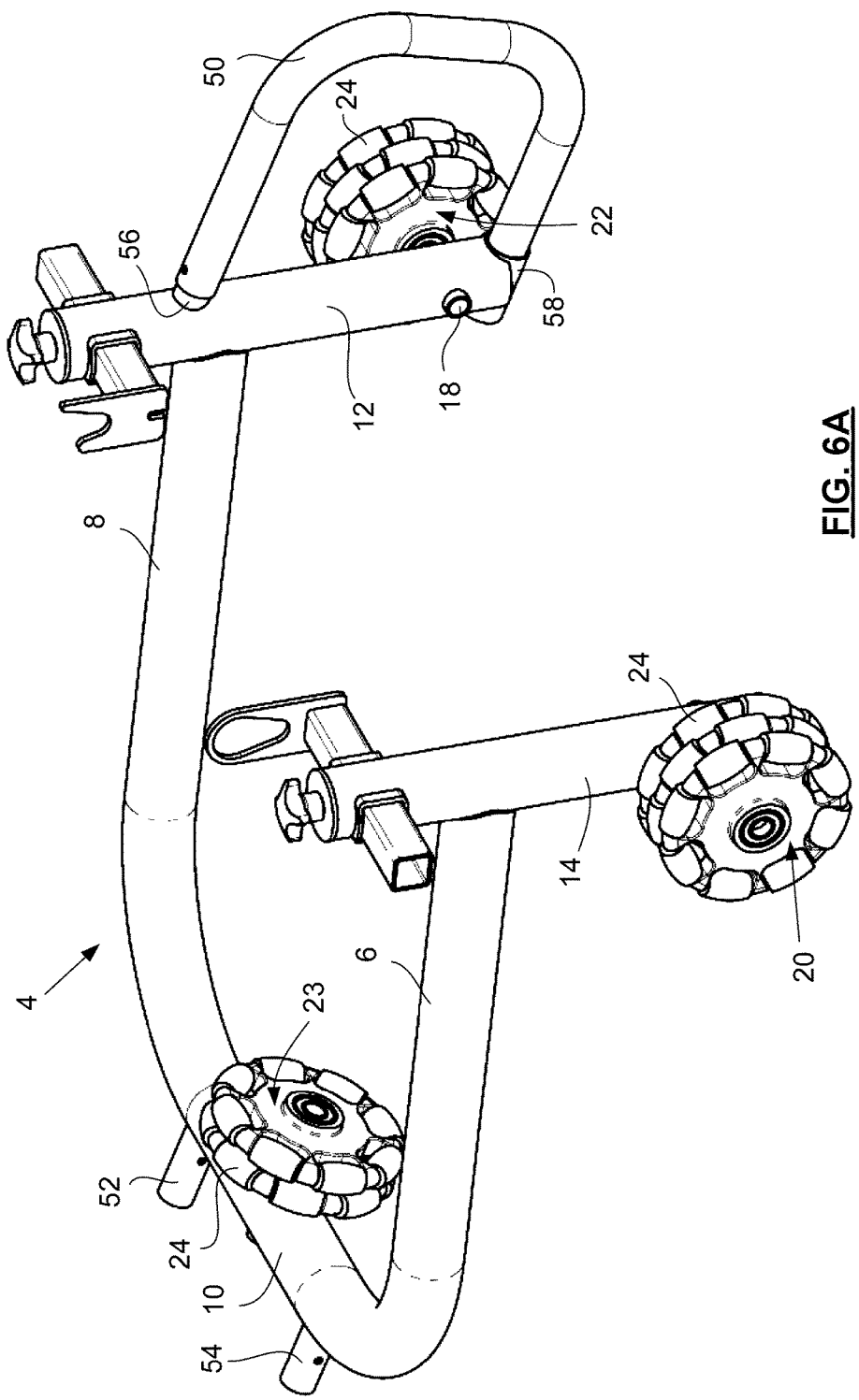
FIG. 6A is a second view of the dolly of FIG. 6 in a second configuration.
Figure 7:
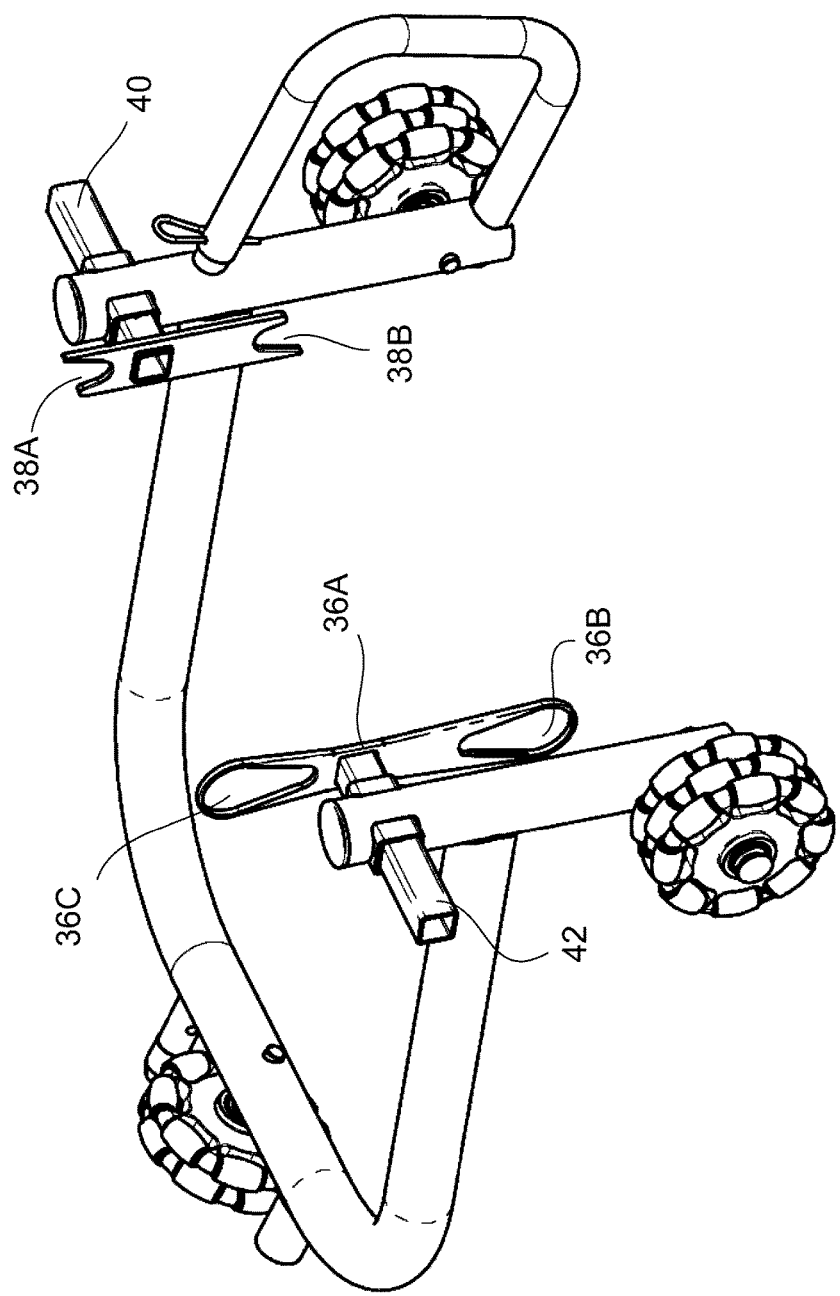
Figure 7A:
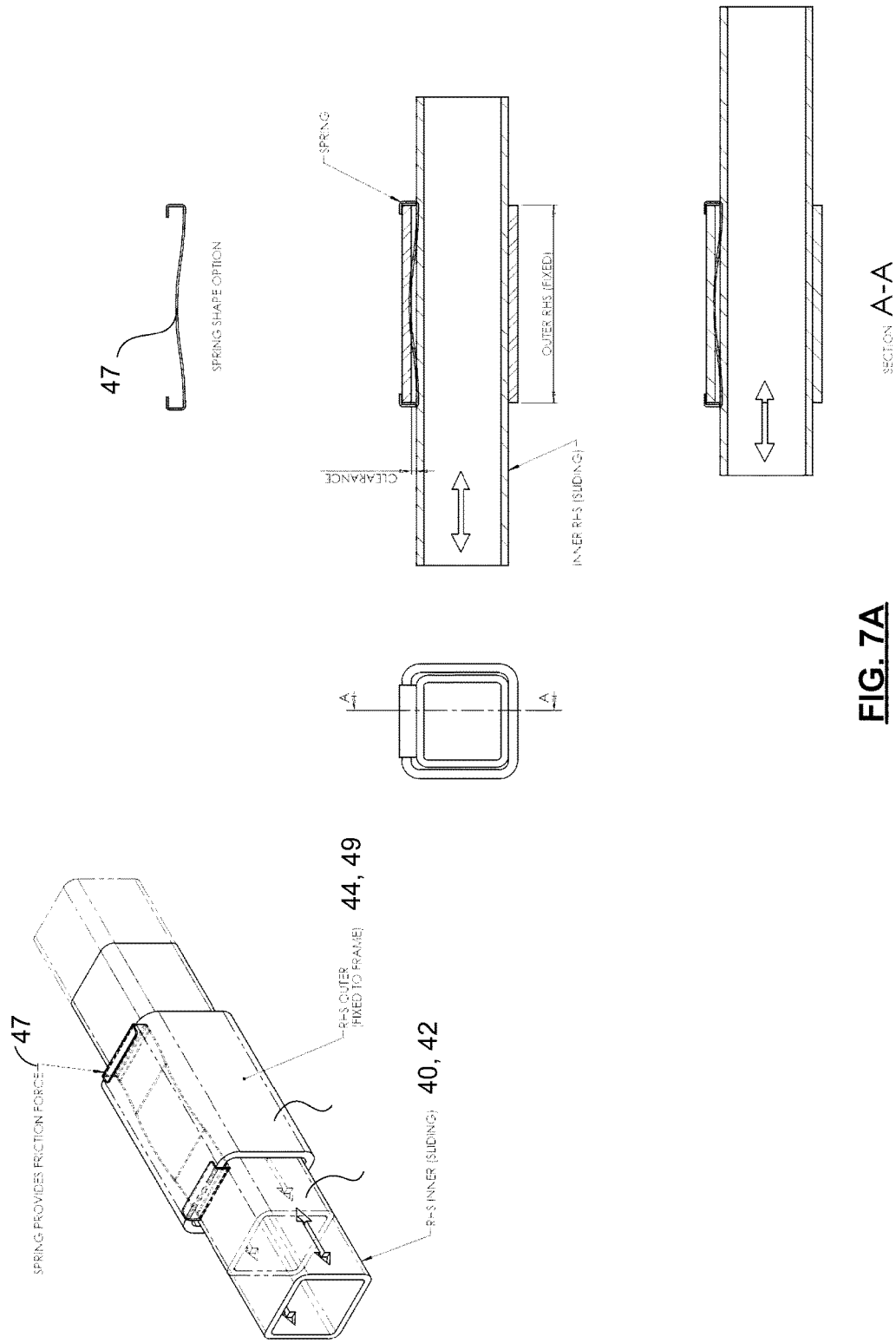
FIG. 7A depicts the friction leaf spring mechanism of the dolly of FIGS. 6 and 7.

Referring now to FIGS. 6A and 7, handle 50 detachably mounts to rearward posts 52, 54 that extend from the spacing member 10.

A forward portion of the frame, namely a forward face of the second upright 12, is fitted an upper post 56 and a lower tube 58 in FIG. 6A (or a cutout in the bottom of upright 12 in FIG. 7) which respectively engage opposed ends of the U-shaped handle 50. As will be explained further, when the handle 50 is mounted to the rearward portion of the frame, as shown in FIG. 6, it provides additional mechanical advantage for rotating the frame about the first and second wheels 20, 22 with the motorcycle loaded to thereby bring the frame to a stable, "over center" configuration. Once in the over center configuration the handle 50 is removed from the reward position shown in FIG. 6 and attached to the front of the frame as shown in FIG. 6A or 7.

Once attached to the front of the frame 4 the handle 50 will be brought into ground contact should the frame inadvertently tend to move out of the over-center configuration during maneuvering of the motorcycle. Accordingly, when in the forward location that is shown in FIG. 7 the handle 50 acts as an anti-tipping member. That is, it provides a safety measure to maintain the frame in the stable over center configuration, wherein the motorcycle is safely engaged.

FIG. 7 illustrates a variation of dolly 2 in that cradle 36A has a pair of opposed closed loop like portions 36B and 36C as opposed to a single portion illustrated in FIG. 6. Portions 36B and 36C are not equally spaced from the central axis; instead, one portion (36B in FIG. 24C) is spaced away from the axis by a greater distance. The choice of portions 36C, 36B to be uppermost can be selected by inserting the lateral shaft/beam 42 in the correct orientation. Similarly, cradle 38 in FIG. 6 is modified to have a pair of opposed cradles 38A, 38B which are also spaced from the axis in a manner similar to that described with reference to 36B, 36C. The choice of which cradle is uppermost is again selected by inserting the lateral shaft/beam 40 in the correct orientation.

This accommodates motorcycles having pins 62 at different heights above the floor.

Referring now to FIGS. 8 and 9, in use, the dolly 2 is brought around to the rear of motorcycle 60 with the handle 50 attached to the rear spacing member 10 of the frame 4. The handle 50 is raised as shown so that the uprights 14, 12 tilt forward about the axles of first and second dolly wheels 20, 22.

Accordingly, the motorcycle support assemblies 32 34 are brought to about the level of the motorcycle handling pins 62, 64 (visible in FIG. 10) which extend laterally from the rear wheel swing arms 66, 68 (visible in FIG. 10) of the motorcycle 60.

The cradle 36, which includes capture member 48 is firstly located over the pin 62. The capture member 48 comprises an arcuate member that over arches the remainder of the cradle and is integrally formed therewith. The capture member 48 makes it easier for a user to locate the cradle 36 on the pin 62 by virtue of the operator not needing to balance the motorcycle in the upright position whilst simultaneously engaging the dolly with the motorcycle.

The pin 62 is formed somewhat as a sheave with an enlarged head so that once it has been captured by the cradle 36 it is unlikely to inadvertently come free unless due to deliberate action. Now that the pin 62 has been captured in the cradle 36, the operator tilts the motorcycle to the upright position and the dolly 2 is positioned to bring the opposite pin 64 into cradle 38, as shown in FIG. 10.

Figure 11:
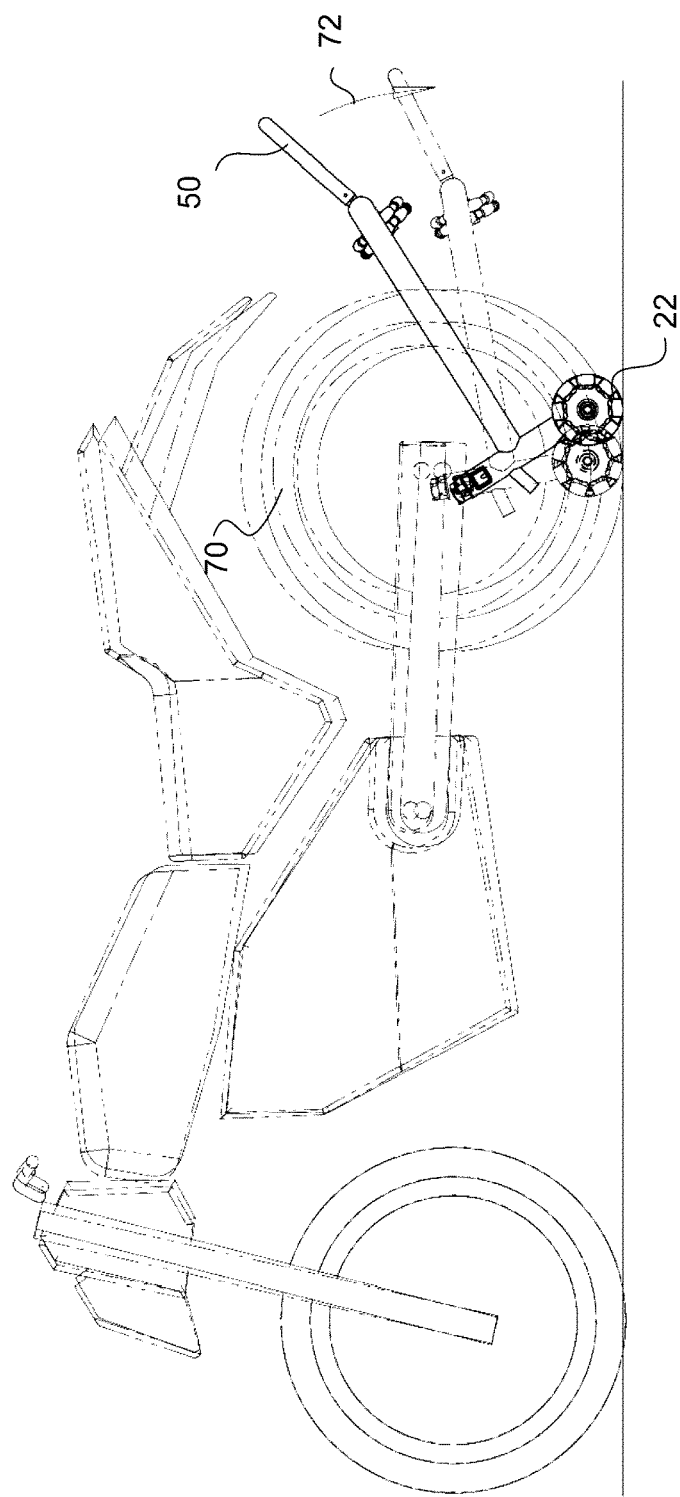

Now that the motorcycle handling pins 62, 64 are both positioned within the support cradles 36, 38, the handle 10 is forced downward by the operator as indicated by arrow 72 in FIG. 11 thereby bringing the first and second dolly wheels 20, 22 beneath and then past the handling pins 62, 64 until the third dolly wheel 23 rests upon the ground. The action of swinging the handle 50 downward causes the uprights 12 and 14 to in turn swing upward thereby raising the pins 62, 64 and so the swing arms 66, 68 thereby bringing the motorcycle's rear wheel 70 off the ground. The uprights 12, 14 continue to swing as the handle 50 is brought downward until coming to the over center resting position shown in FIG. 12.

Figure 12:
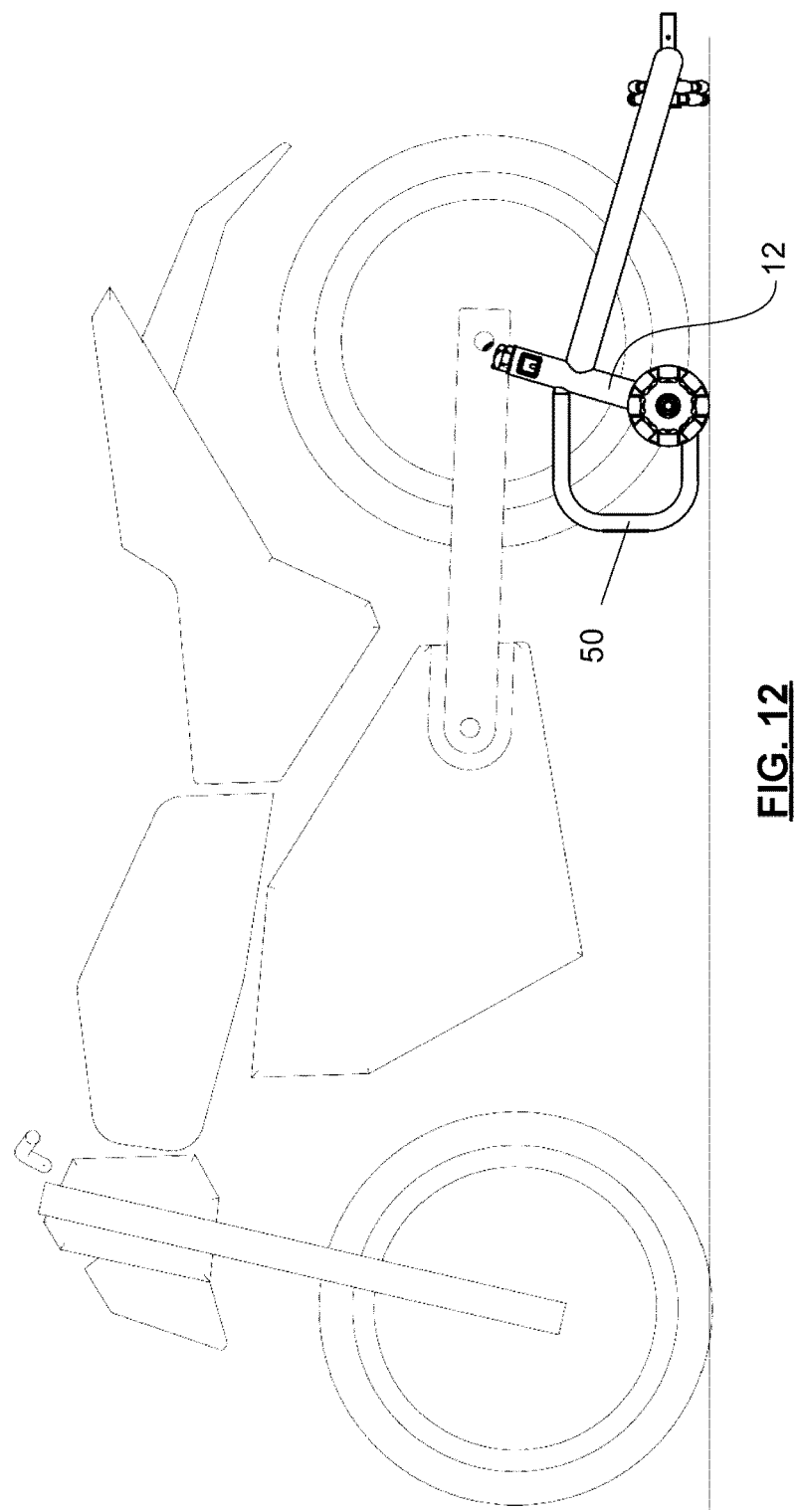
Figure 14:
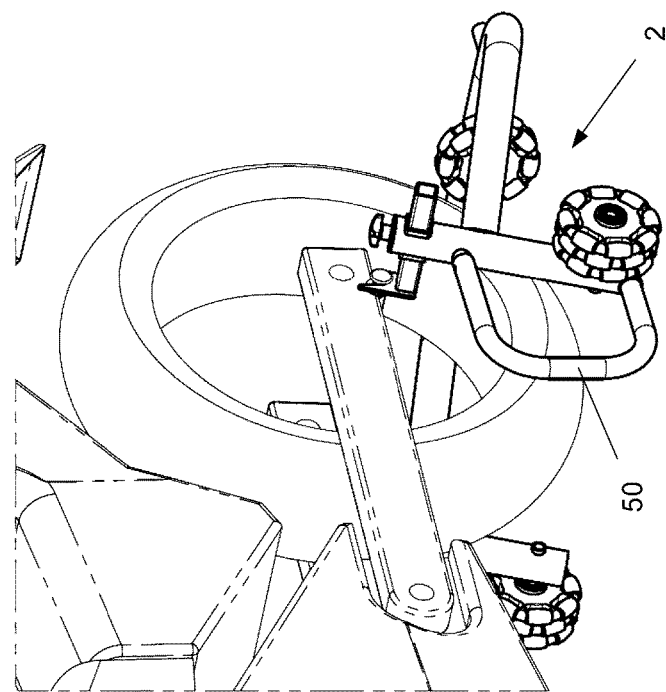

Once in the position shown in FIG. 12 the handle 50 is detached from its rearward position and mounted on the forward end of the upright 12 as shown. Consequently, as shown in FIGS. 13 and 14, the handle now acts as an anti-tipping mechanism to prevent the dolly from inadvertently being brought from the stable over center resting position that is shown in FIG. 12.

Figure 13:
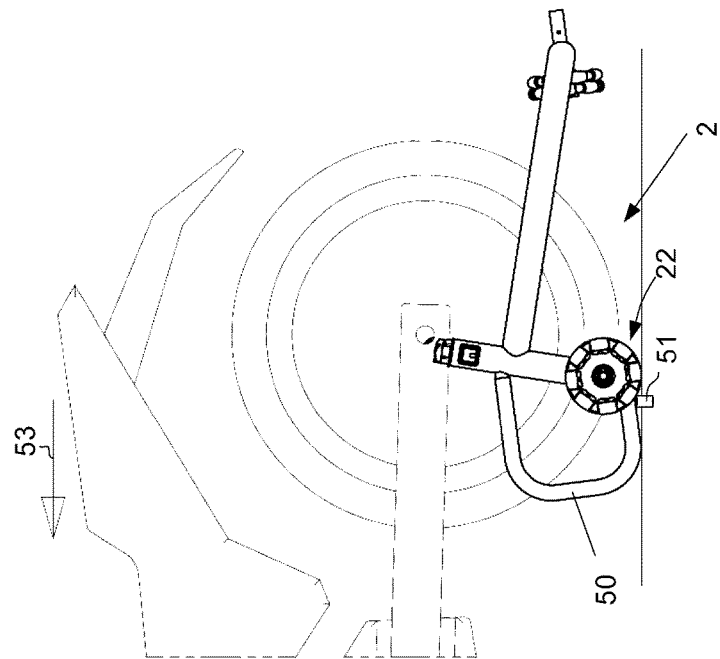

For example as shown in FIG. 13, in order to move the dolly and hence the motorcycle a translation force 53 is applied to the motorcycle. Consequently the dolly and the motorcycle move forward. However, upon the wheel 24 encountering an obstacle 51 there is a tendency for the dolly to tip forward, i.e. counter clockwise. In that case the anti-tipping member in the form of handle 50 reacts with the ground to counter the potential tipping. Without the anti-tipping feature, if the dolly were to continue to tip forward, pins 62, 64 would pass through the vertical plane through the axis of the first and second dolly wheels 20, 22, and the motorcycle would be in an unstable position.

When in the configuration shown in FIG. 12, the rear wheel of the motorcycle is clear of the ground so that the rear of the motorcycle can now be moved in any horizontal direction on the dolly's omni-directional wheels. The front wheel of the motorcycle moves as normal and the motorcycle is supported in an upright position. A person handling the motorcycle is not required to hold it upright since the dolly 2 maintains the motorcycle upright. Consequently the motorcycle can be readily maneuvered in a tight space such as an internal storage area, workspace and the like.

Figure 15:
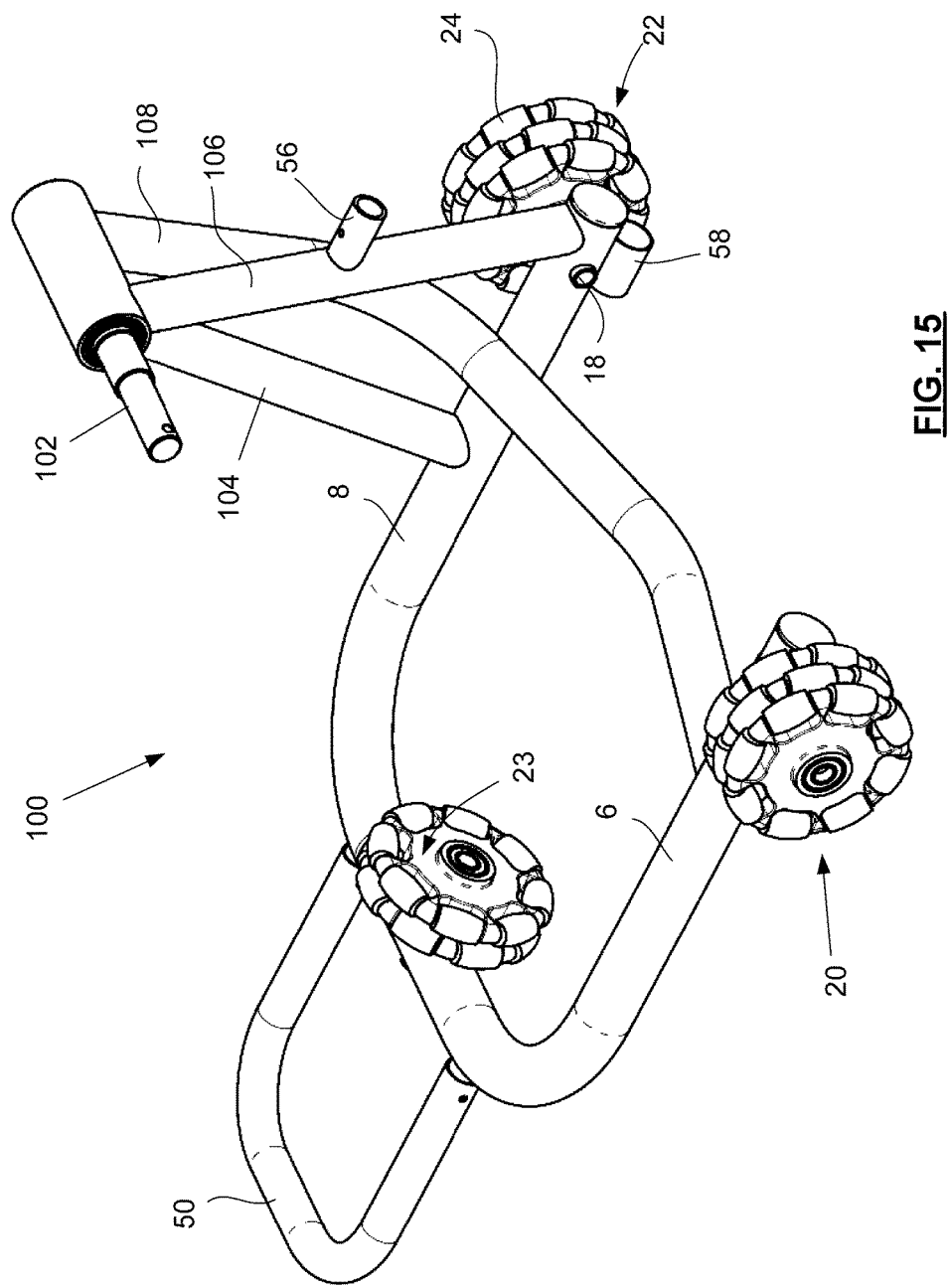
Figure 16:
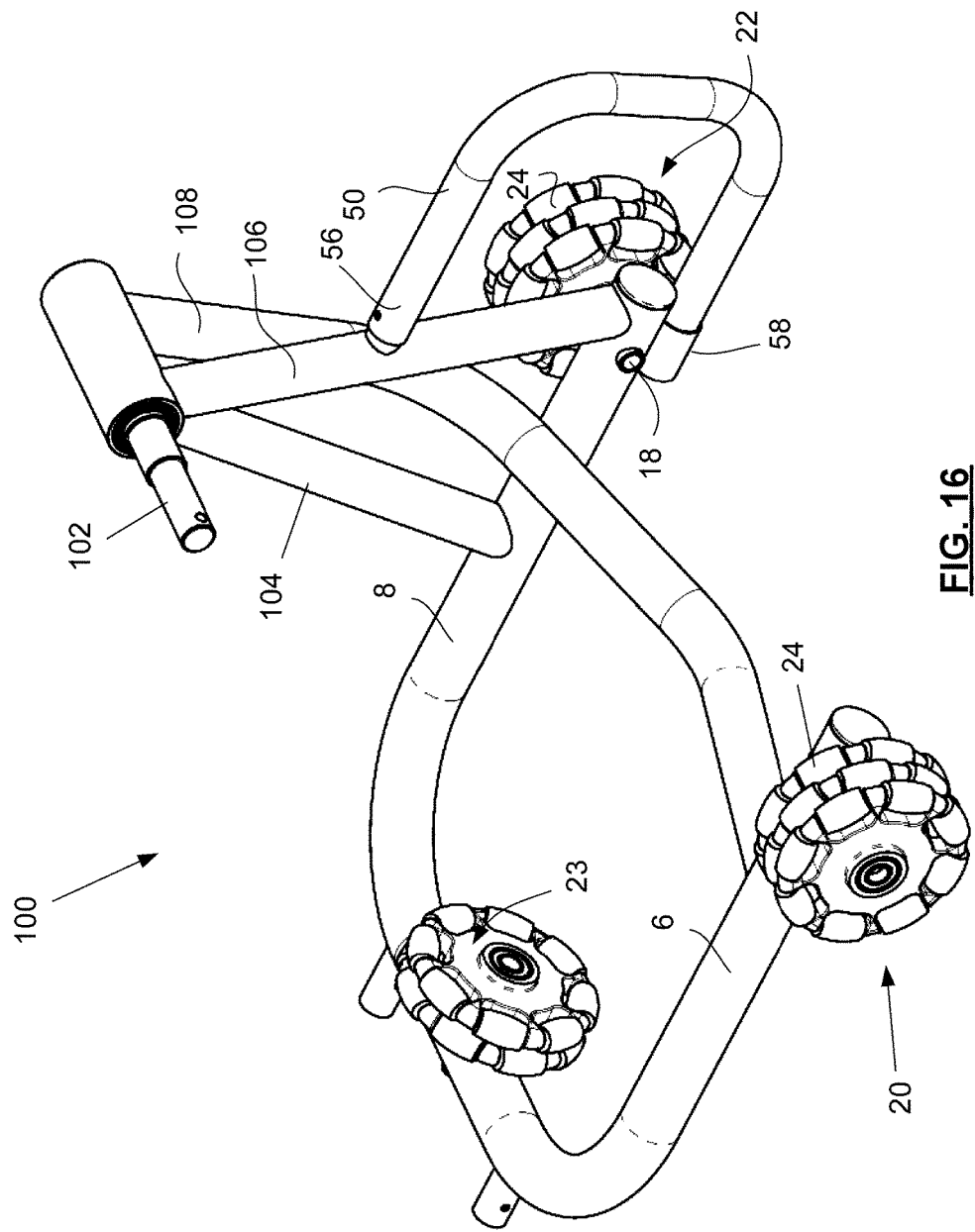

Referring now to FIG. 15, there is depicted a different type of "second" dolly 100 which can be seen as a single sided dolly as it supports the motorcycle from only one side of the wheel. The dolly 100 has a stem 102. The stem is arranged for insertion into an axial recess of a rear wheel of motorcycle. Not all motorcycles are equipped with handling pins. Rather in some cases motorcycles, particularly motorcycles that have only a one sided rear wheel swing arm, are provided with an axial recess. Accordingly, various embodiments of the invention are provided to accommodate for both types of motorcycle handling arrangements.

The stem 102 is mounted above the second arm 8 by angled bracing members 104 and 106. It is also coupled to the first arm 6 by a transverse bracing member 108.

The first and second dolly wheels 20 and 22 are coupled to forward end portions of the first and second arms 6, 8 respectively by stub axles 16, 18. The operation of the dolly 100 is analogous to that of the dolly 2 of the first embodiment. In particular, the handle 50 may be detached from the rearward spacing member 10 of the frame 4 and reattached to the front of the frame to a stub 56 extending from the front of the members 106 or 108 and a recess 58 mounted to the forward end of the second arm 8 of the frame 4.

Figure 17:
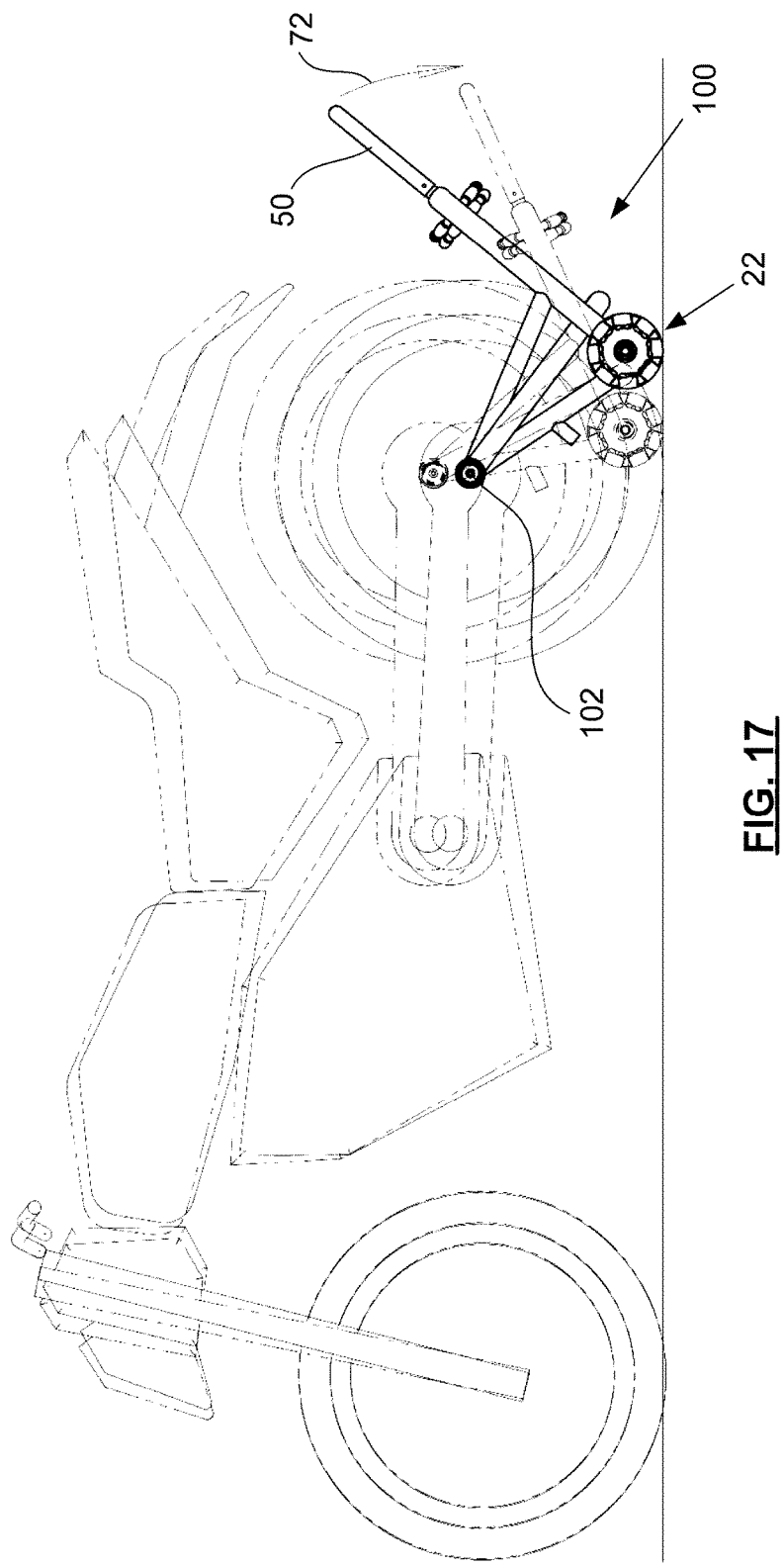

As shown in FIG. 17, once the stem 102 of the dolly 100 has been inserted into the axial recess of the rear wheel of the motorcycle force is applied to push handle 50 downward thereby raising the motorcycle rear wheel until the dolly 100 attains the stable "over center" position shown in FIG. 18 wherein the handle 50 has been repositioned to the front of the dolly 100 as shown. In order to move the dolly and hence the motorcycle a translation force 112 is applied to the motorcycle. Consequently the dolly and the motorcycle move forward. However, upon the wheel 22 encountering an obstacle 51 there is a tendency for the dolly to tip forward, i.e. counter clockwise.

In that case the anti-tipping member in the form of handle 50 reacts with the ground to counter the potential tipping.

Figure 19A:
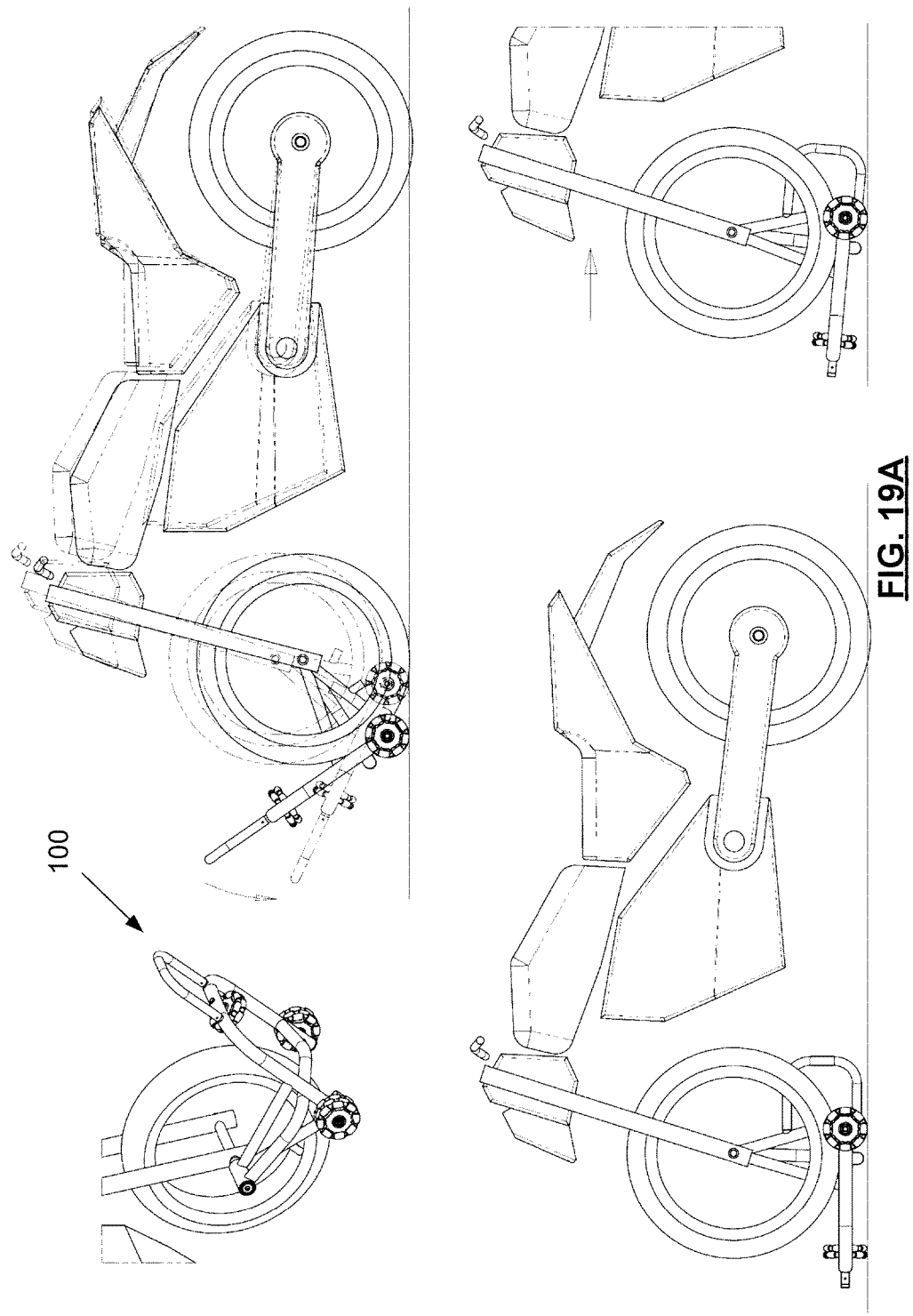
FIG. 19A shows the use of the dolly of FIG. 16 with a forward wheel of the motorcycle.

It is possible that the dolly 100 may be used with a front wheel of the motorcycle. Such a scenario is illustrated in FIG. 19A which illustrates a situation wherein the dolly 100 has been fitted to the front wheel of the motorcycle. If desired two such dollies 100 may be used, one for the front wheel and one for the rear wheel. Similarly, a dolly 2 could also be used on the front wheel, and a dolly 2 or dolly 100 used on the rear wheel.

Figure 19B:
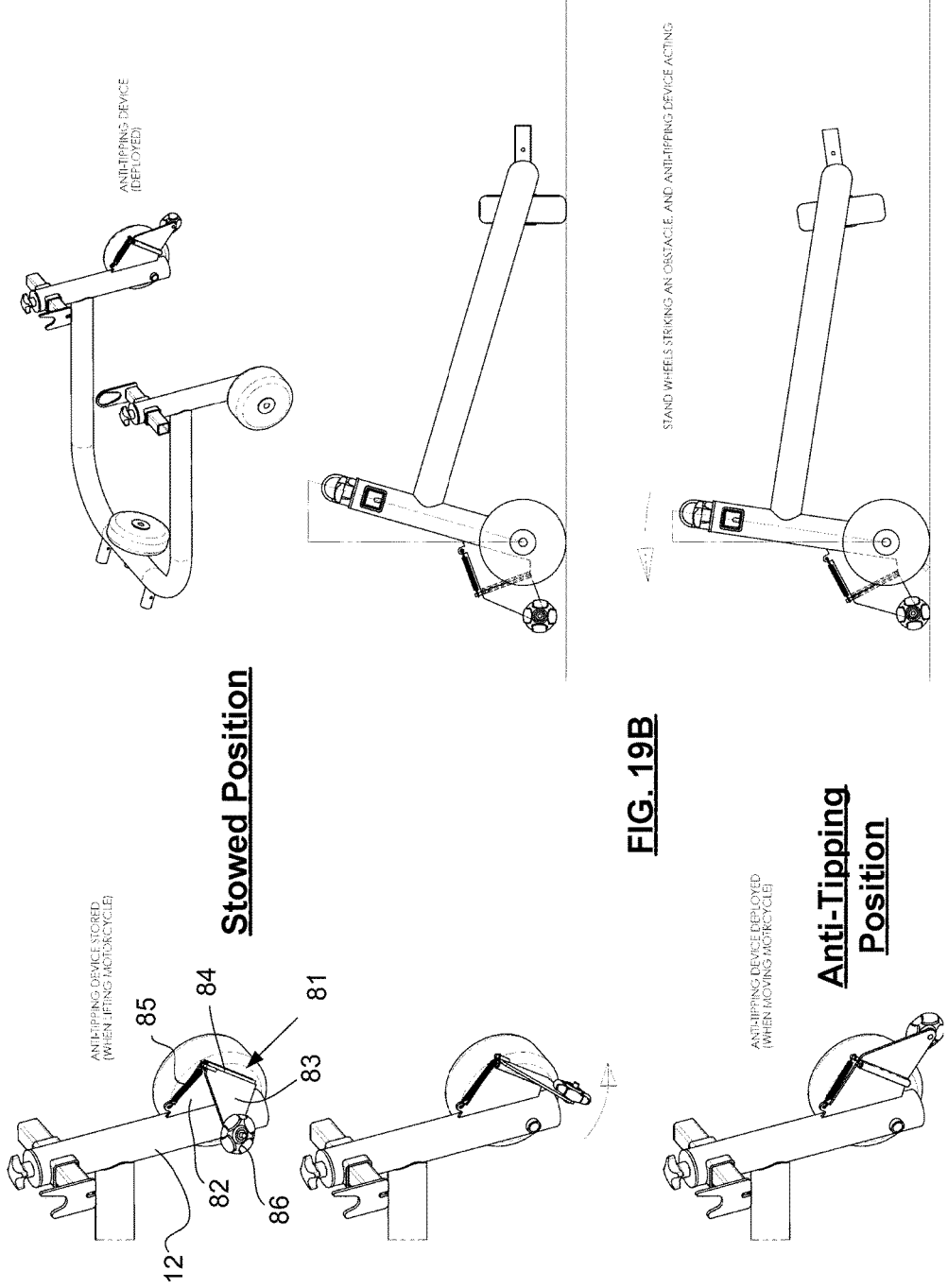
FIG. 19B illustrates a further anti-tipping assembly according to an embodiment of the present invention.

Referring now to FIG. 19B, a further embodiment of the invention is illustrated which includes an anti-tipping assembly 81. The anti-tipping assembly 81 includes a mounting arm 82 that is fast with a forward side of the upright 12. An anti-tipping member 83 is attached to mounting arm 82 by means of hinge 84. The anti-tipping member 83 is pivoted about the hinge 84 to a stowed position when the dolly is placed under the motorcycle and the motorcycle lifted. When the motorcycle is being moved, the anti-tipping member 83 is deployed (it is spring loaded by means of spring 85 over-center, so the arm is either placed in the stowed position, or in the full extended anti-tipping position). A remote end of the anti-tipping member 83 is fitted with a ground contact member in the form of wheel 86. Should the dolly wheels strike an obstacle (e.g. a crack in the ground) thereby causing the dolly to tip forward, the wheel 86 contacts the ground and prevents the motorcycle from going over-center on the dolly and falling over. Wheel 86 is however optional.

Figure 19C:
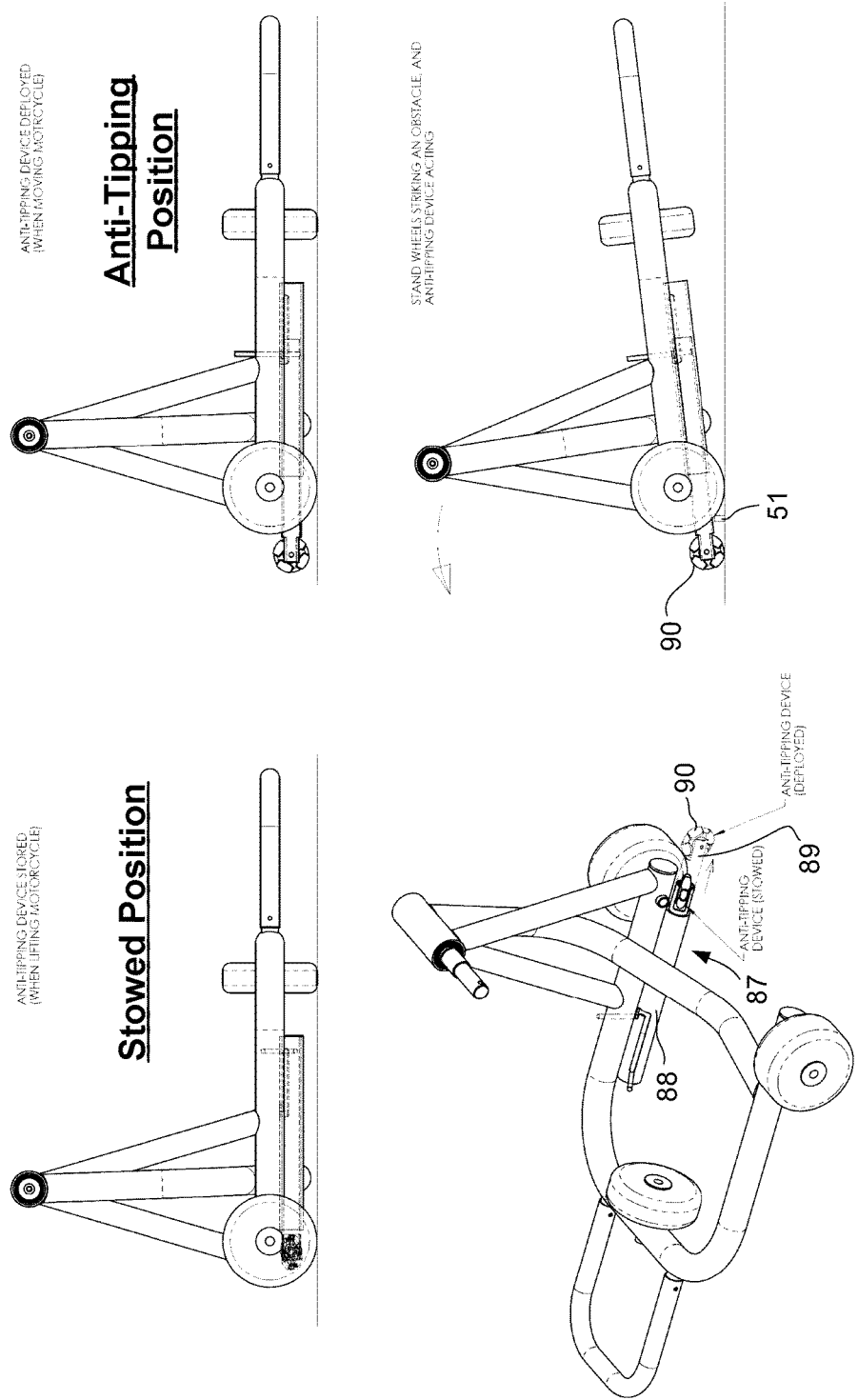

FIG. 19C illustrates a further embodiment of the invention which includes a further type of anti-tipping assembly 87. The anti-tipping assembly 87 includes a tube 88 that receives an anti-tipping member in the form of a shaft 89. The shaft 89 may be telescoped forwardly from the tube 88. A ground contact member (optionally in the form of a wheel 90) is mounted to a forward end of the shaft 89. The shaft 89 may be retracted so that the wheel 90 is stowed when operating the dolly to lift the motorcycle. The shaft 89 is extended forwardly to an anti-tipping position when moving the dolly and motorcycle so that the wheel 90 will contact the ground and prevent tipping in the event of the dolly wheels encountering an obstacle 51.

Figure 20:
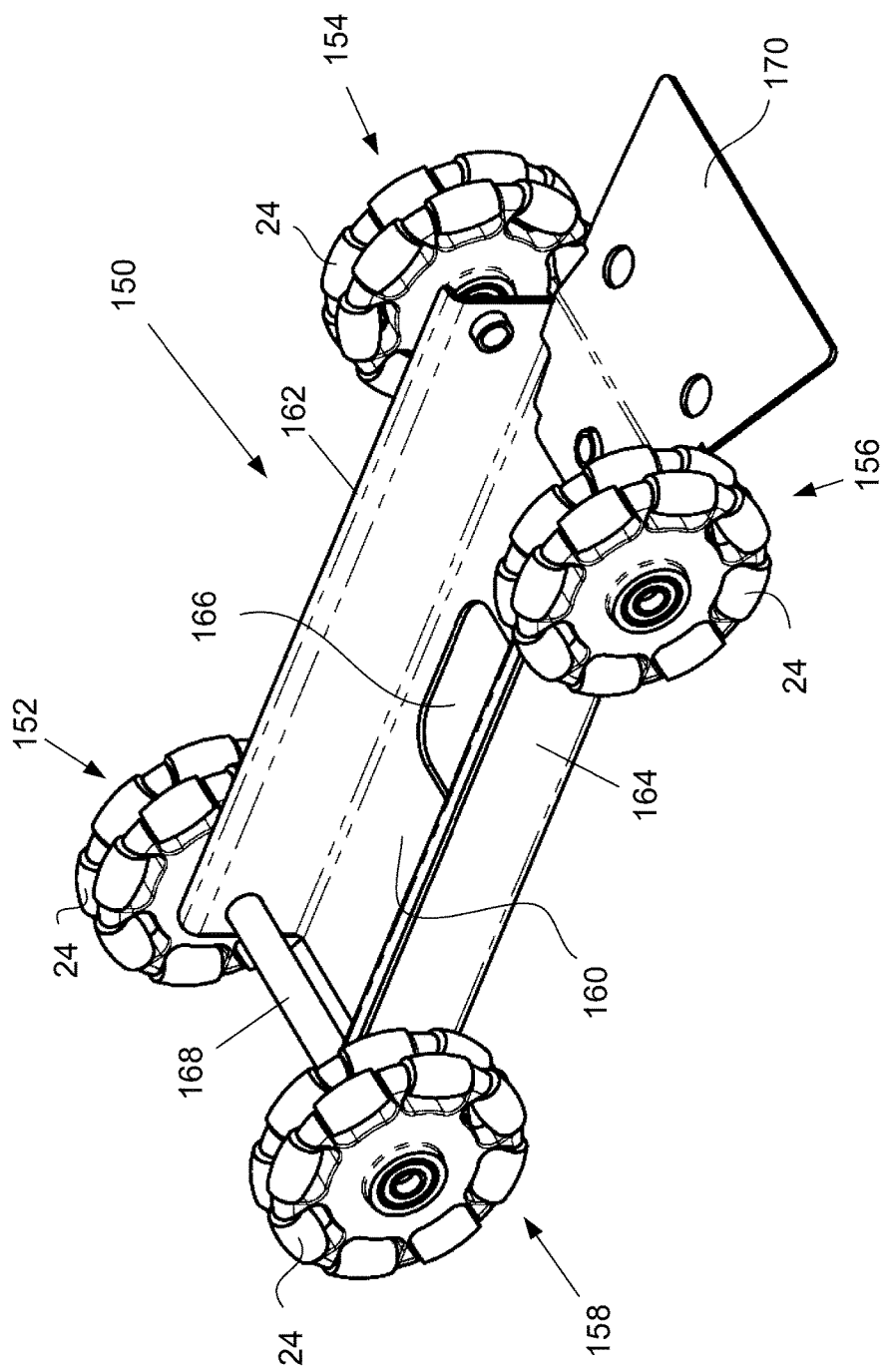

Referring now to FIG. 20, there is shown a cart 150. The cart 150 is for supporting a wheel of a motorcycle clear of the ground in order to assist in maneuvering the wheel in conjunction with, or separate to, the use of a another dolly as described above. The cart may be used on the front wheel.

The wheels 152,154,156,158 of the cart are omni-directional wheels of the same type previously described above. That is, each wheel includes peripheral rotatable ground contact members in the form of rollers 24 for motion parallel to a major axis of each wheel.

The cart 150 is comprised of a channel that includes a floor or platform 160 and side walls 162, 164. The side walls 162, 164 have wheel axles fixed thereto which couple each of the wheels to the side walls.

The support platform 160 includes a formation for locating the wheel of the motorcycle in the form of a cutout 166 for receiving a portion of the wheel. Furthermore, a retaining member 168 is disposed between the forward ends of the side walls 162, 164 which prevents the wheel of the motorcycle from rolling out of the cart should it inadvertently be displaced from the cutout 166.

Figure 21:
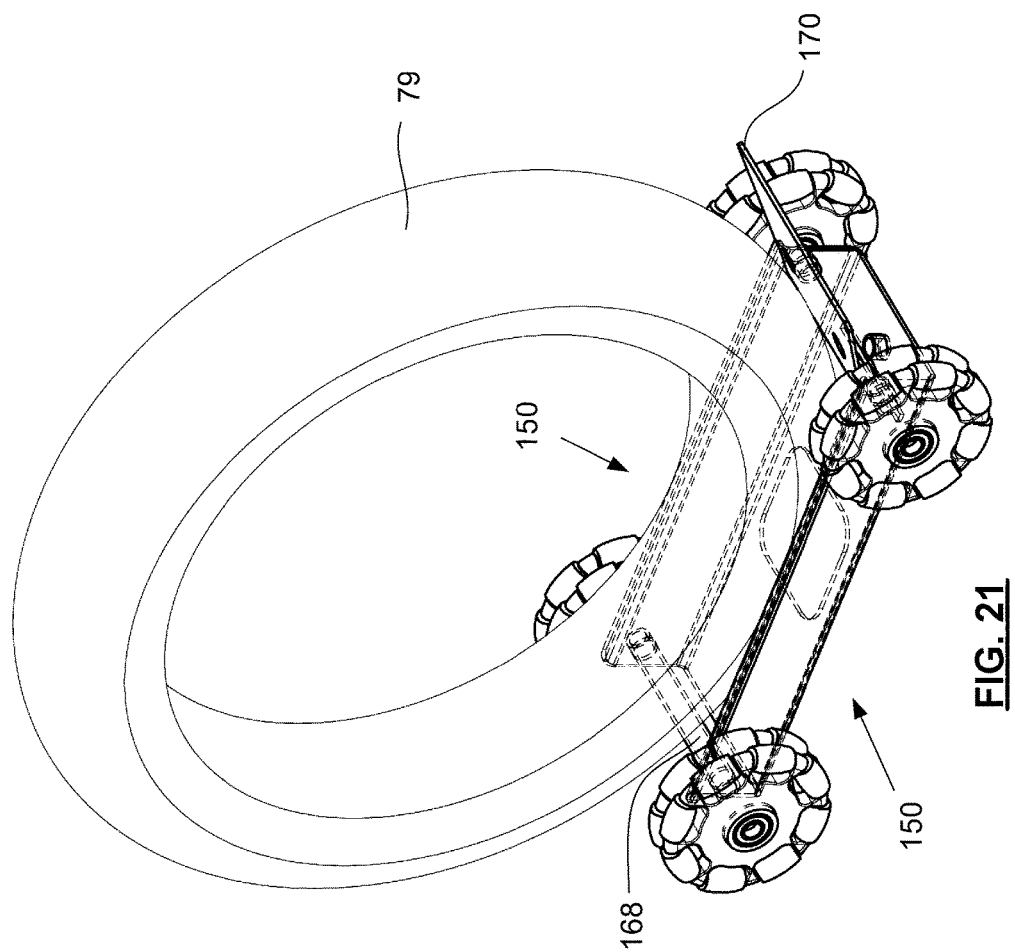

The cart 150 includes a rearward ramp 170 for assisting in rolling the front of the motorcycle onto the platform 160. With reference to FIG. 21, once the wheel 79 has been rolled up the ramp 170 and located in the cart 150 then the ramp 170 may be raised so that it cooperates with the retaining member 168 to capture the wheel 79 in the cart.

Figure 22:
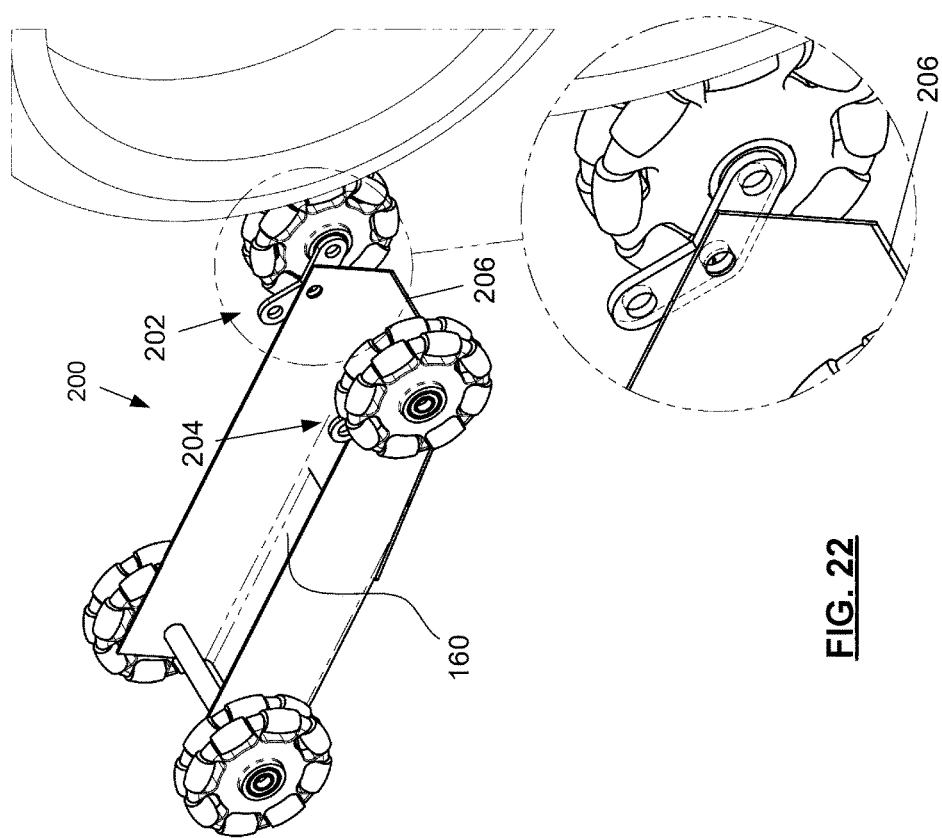

Referring now to FIGS. 22 and 23 there is depicted a further embodiment of the cart 200. The cart 200 includes rear wheel mounting assemblies 202, 204 that are arranged swing between a raised wheel configuration and a lowered wheel configuration so that the rearward pair of the wheels of the cart can be raised in order to lower a rearward edge 206 of the platform to thereby assist in progressing the wheel 79 of the motorcycle onto the platform 160. Once the wheel is on the platform 160 as shown in FIG. 23, the mounting assemblies 202, 204 are rotated to lower the rear wheels and thereby raise the rear edge 206 of the cart 200 from the ground.

Referring now to FIGS. 24A-C, a motorcycle dolly assembly according to a preferred embodiment of the present invention includes both a front wheel dolly, for example dolly 410 and a rear wheel dolly such as dolly 2 as shown or dolly 100. The figures also illustrate two versions of the single-side rear stand as motorcycles with a single-sided swing arm may have the hole in the rear wheel hub on either the right hand side or left hand side. FIGS. 25-27 illustrate a combination as above with a motor scooter 428 supported by the dollies.

It will therefore be realised that embodiments of the present invention provide an apparatus for assisting in the convenient stowage of motorcycles since they provide apparatus that facilitate the raising of the rear wheel and/or the front wheel of the motorcycle and the maneuvering of the motorcycle both laterally and longitudinally and in directions therebetween.

In compliance with the statute, the invention has been described in language more or less specific to structural or methodical features. The term "comprises" and its variations, such as "comprising" and "comprised of" is used throughout in an inclusive sense and not to the exclusion of any additional features. It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

Throughout the specification and claims (if present), unless the context requires otherwise, the term "substantially" or "about" will be understood to not be limited to the value for the range qualified by the terms.

Any embodiment of the invention is meant to be illustrative only and is not meant to be limiting to the invention. Therefore, it should be appreciated that various other changes and modifications can be made to any embodiment described without departing from the spirit and scope of the invention.

The invention claimed is:

1. A tyre interfacing dolly adapted to lift and support a tyre of a motorcycle or motor scooter off the ground, the dolly comprising:
    axially aligned wheels;
    a frame which has a front frame part forward of the axially aligned wheels and a rear frame part behind the axially aligned wheels, the front frame part having a pair of tyre contacting members adjacent an open end of the front frame part to directly contact a motorcycle or motor scooter tyre and locate the tyre in the open end of the front frame part;
when the front frame part is lifted to lift the motorcycle or motor scooter tyre off the ground and release the tyre when the front frame part is lowered;
    at least one additional wheel on the rear frame part;
    each of said pair of tyre contacting members comprising a ramped face configured to wedge against each side of the tyre; and
    wherein the front frame part and the rear frame part are rigidly connected and angled relative to each other whereby lowering of the rear frame part by a user causes said lifting of the front frame part and results in said ramped faces of each of said tyre contacting members wedging against each side of the tyre respectively thereby lifting the motorcycle or motor scooter tyre off the ground to support the motorcycle or motor scooter tyre in a raised configuration and wherein raising of the rear frame part by the user releases the motorcycle or motor scooter tyre from the open end of the front frame part in a lowered configuration.

2. The dolly of claim 1, wherein the axially aligned wheels and/or the additional wheel are omni-directional wheels, said omni-directional wheel being capable of multiple directional travel and comprising a central hub rotatable about a main axis and a number of independently mounted rotatable rollers located about a rim of the hub.

3. The dolly of claim 1, wherein the rear frame part includes frame arms extending away from the front frame part and a location stop for the tyre, said location stop extending between said frame arms and supporting the tyre received into the front frame part when the rear frame part is lowered in the lowered configuration such that the tyre contacts said location stop and said tyre contacting members.

4. A combination comprising a dolly according to claim 1 adapted to support a first wheel of a motorcycle or motor scooter and a second dolly adapted to support the second wheel of a motorcycle or motor scooter.

5. The combination of claim 4, wherein the dolly is adapted to support the front wheel of a motorcycle or motor scooter and the second dolly is adapted to support the rear wheel of a motorcycle or motor scooter.

6. The combination of claim 4, wherein the second dolly comprises a frame having first and second arms adapted in use to extend along each side of a motorcycle wheel, and an interconnecting spacing member;
    first and second uprights wherein the first and second arms are coupled respectively to the first and second uprights;
    first and second dolly wheels coupled to lower portions of the first and second uprights respectively and arranged for placement on opposite sides of the motorcycle and coaxial and aligned with the major axis parallel with the axes of the motorcycle wheels;
    a motorcycle engagement assembly coupled to the frame, and;
    a third dolly wheel mounted to the spacing member and including peripheral rotatable ground contact members for motion parallel to the major axis of the wheel.

7. The combination of claim 6, including a handle mounted to the spacing member for assisting in rotating the dolly about the first and second dolly wheels in use to lift the wheel.

8. The combination of claim 6, including an anti-tipping member to prevent inadvertent tipping of the motorcycle into an unstable condition.

9. The combination of claim 8, wherein the anti-tipping member comprises a U shaped member on at least one of the first and second uprights.

10. The combination of claim 9, wherein the U shaped member comprises a handle mounted to the spacing member for assisting in rotating the dolly about the first and second dolly wheels in use to lift the wheel and wherein the handle is removable from the spacing member after the wheel has been lifted by the dolly.

11. A combination in accordance with claim 10 wherein the removable handle can be positioned on at least one of the first and second uprights to prevent inadvertent tipping of the motorcycle into an unstable condition.

12. The combination of claim 6, wherein the motorcycle engagement assembly includes opposed cradles for respectively supporting handling pins on the motor cycle, at least one cradle being provided with a capture member formed over the cradle to provide a closed loop to capture a said motorcycle handling pin in use.

13. The combination of claim 6, wherein the motorcycle engagement assembly includes opposed cradles for respectively supporting handling pins on the motor cycle, at least one said cradle being supported by a lateral shaft, the shaft being slideable in a sleeve in a said upright, and a friction member to frictionally engage the shaft in a desired position, where the frictional force is provided by a spring or elastic element.

14. The combination of claim 4, wherein the second dolly comprises a frame having first and second arms adapted in use to extend along each side of a motorcycle wheel, and an interconnecting spacing member;
- first and second dolly wheels coupled to ends of the first and second arms respectively and arranged for placement on opposite sides of the motorcycle and coaxial and aligned with the major axis parallel with the axes of the motorcycle wheels;
- a third dolly wheel mounted to the spacing member and including peripheral rotatable ground contact members for motion parallel to the major axis of the wheel;
- a motorcycle engagement assembly coupled to the frame and comprising a stem mounted above a said first or second arm by at least one bracing member, the stem adapted for insertion into an axial recess of a wheel of the motorcycle.

15. The combination of claim 14, including a handle mounted to the spacing member for assisting in rotating the dolly about the first and second dolly wheels in use to lift the wheel.

16. The combination of claim 14, including an anti-tipping member to prevent inadvertent tipping of the motorcycle into an unstable condition.

17. The combination of claim 16, wherein the anti-tipping member comprises a U shaped member at least partially on said bracing member.

18. The combination of claim 17, wherein the U shaped member comprises a handle mounted to the spacing member for assisting in rotating the dolly about the first and second dolly wheels in use to lift the wheel wherein the handle is removed from the spacing member after the wheel has been lifted by the dolly and placed on at least partially one said bracing member to become the anti-tipping member.

19. The combination of claim 4, wherein the second dolly comprises a cart having a channel including a platform and side walls, the side walls supporting wheels, the platform having a recess for receiving a portion of a motorcycle wheel, a retaining member disposed between forward ends of the side walls to prevent the wheel of the motorcycle from rolling out of the cart should it inadvertently be displaced from the recess, and a ramp for assisting in rolling the motorcycle onto the platform.

20. The combination of claim 4, wherein all said wheels comprise omni-directional wheels for motion in any horizontal direction.

* * * * *